US011928998B2

(12) United States Patent
Kwon et al.

(10) Patent No.: US 11,928,998 B2
(45) **Date of Patent: *Mar. 12, 2024**

(54) DISPLAY DEVICE PERFORMING MULTI-FREQUENCY DRIVING, AND METHOD OF OPERATING A DISPLAY DEVICE

(71) Applicant: Samsung Display Co., Ltd., Yongin-si (KR)

(72) Inventors: Sangan Kwon, Cheonan-si (KR); Soon-Dong Kim, Osan-si (KR); Taehoon Kim, Hwaseong-si (KR); Hui Nam, Suwon-si (KR); Eun Sil Yun, Hwaseong-si (KR); Changnoh Yoon, Seoul (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/108,838

(22) Filed: Feb. 13, 2023

(65) Prior Publication Data

US 2023/0196959 A1 Jun. 22, 2023

Related U.S. Application Data

(63) Continuation of application No. 17/202,769, filed on Mar. 16, 2021, now Pat. No. 11,580,886.

(30) Foreign Application Priority Data

Jul. 23, 2020 (KR) ........................ 10-2020-0091894

(51) Int. Cl.

*G09G 3/00* (2006.01)
*G09G 3/3233* (2016.01)
*G09G 3/3291* (2016.01)

(52) U.S. Cl.

CPC ........... *G09G 3/035* (2020.08); *G09G 3/3233* (2013.01); *G09G 3/3291* (2013.01); *G09G 2310/027* (2013.01); *G09G 2380/02* (2013.01)

(58) Field of Classification Search

CPC ... G09G 2300/0819; G09G 2300/0842; G09G 2310/027; G09G 2310/08;

(Continued)

(56) References Cited

U.S. PATENT DOCUMENTS

2003/0048246 A1* 3/2003 Ham .................... G09G 3/3648 345/698
2007/0030219 A1 2/2007 Park et al.

(Continued)

FOREIGN PATENT DOCUMENTS

KR 100923347 B1 10/2009
KR 1020190085209 A 7/2019
KR 102005872 B1 8/2019

OTHER PUBLICATIONS

Extended European Search Report—European Application No. 21186774.2 dated Nov. 15, 2021, citing references listed within.

(Continued)

*Primary Examiner* — Richard J Hong
(74) *Attorney, Agent, or Firm* — CANTOR COLBURN LLP

(57) ABSTRACT

A display device includes a display panel including a first partial panel region and a second partial panel region, and a panel driver which drives the display panel. The panel driver determines a first driving frequency for the first partial panel region and a second driving frequency for the second partial panel region. In a case where the first driving frequency and the second driving frequency are different from each other, the panel driver sets a boundary portion including a boundary between the first partial panel region and the second partial panel region, and determines a third driving fre- (Continued)

quency for the boundary portion to be between the first driving frequency and the second driving frequency.

20 Claims, 13 Drawing Sheets

(58) Field of Classification Search
CPC ... G09G 2300/0814; G09G 2300/0861; G09G 2300/0866; G09G 2310/0251; G09G 2310/04; G09G 2310/061; G09G 2320/103; G09G 2340/0435; G09G 2360/16; G09G 2380/02; G09G 3/035; G09G 3/3233; G09G 3/3258; G09G 3/3291; G09G 2310/0267; G09G 2330/021; G09G 3/2007; G09G 3/32; G09G 3/3266; G09G 3/20; G09G 3/3666; G09G 3/3655; G09G 3/3688; G09G 3/3648
See application file for complete search history.

(56) References Cited

U.S. PATENT DOCUMENTS

2007/0229447 A1* 10/2007 Takahara ............. G09G 3/3655 345/102
2009/0273555 A1* 11/2009 Song .................... G09G 3/3688 345/96
2010/0134401 A1 6/2010 Shin et al.
2013/0038621 A1 2/2013 Choi et al.
2013/0113811 A1 5/2013 Choi et al.
2015/0170607 A1* 6/2015 Shin ..................... G09G 3/3406 345/690
2015/0243204 A1 8/2015 Park et al.
2016/0063914 A1 3/2016 Lee et al.
2016/0078846 A1 3/2016 Liu et al.
2016/0111055 A1* 4/2016 Na ....................... G09G 3/3666 345/94
2016/0275903 A1* 9/2016 Park ......................... G09G 3/20
2017/0018234 A1 1/2017 Na et al.
2017/0116946 A1 4/2017 Nakatani et al.
2018/0040289 A1 2/2018 Lee et al.
2018/0286314 A1 10/2018 Cho et al.
2019/0005862 A1 1/2019 Zhang
2019/0033919 A1 1/2019 Hirakata et al.
2020/0211475 A1 7/2020 Park et al.
2020/0394984 A1* 12/2020 Park ..................... G09G 3/3266
2021/0118378 A1 4/2021 Son et al.
2021/0201800 A1 7/2021 Ahn et al.

OTHER PUBLICATIONS

European Office Action for Application No. 21 186 774.2-1210 dated Jan. 17, 2024.

* cited by examiner

DISPLAY DEVICE PERFORMING MULTI-FREQUENCY DRIVING, AND METHOD OF OPERATING A DISPLAY DEVICE

This application is a continuation of U.S. patent application Ser. No. 17/202,769, filed on Mar. 16, 2021, which claims priority to Korean Patent Application No. 10-2020-0091894, filed on Jul. 23, 2020, and all the benefits accruing therefrom under 35 U.S.C. § 119, the content of which in its entirety is herein incorporated by reference.

BACKGROUND

1. Field

Embodiments of the invention relate to a display device, and more particularly to a display device that performs multi-frequency driving ("MFD").

2. Description of the Related Art

Reduction of power consumption is desirable in a display device employed in a portable device, such as a smartphone, a tablet computer, etc. Recently, a low frequency driving technique which drives or refreshes a display panel at a frequency lower than a normal driving frequency (e.g., about 60 Hz, about 100 Hz, about 120 Hz, etc.) may be used to reduce the power consumption of the display device.

SUMMARY

In a display device to which the low frequency driving technique is applied, when a still image is not displayed in an entire region of a display panel, or when the still image is displayed only in a partial region of the display panel, the entire region of the display panel may be driven at a normal driving frequency. Thus, in this case, the low frequency driving may not be performed, and the power consumption may not be reduced.

Embodiments provide a display device with reduced power consumption by performing multi-frequency driving ("MFD") and with improved display quality by reducing a luminance difference between a high frequency region and a low frequency region.

Embodiments provide a method of operating a display device for reducing power consumption by performing MFD and reducing a luminance difference between a high frequency region and a low frequency region.

According to an embodiment, a display device includes a display panel including a first partial panel region and a second partial panel region, and a panel driver which drives the display panel. In such an embodiment, the panel driver determines a first driving frequency for the first partial panel region and a second driving frequency for the second partial panel region. In such an embodiment, in a case where the second driving frequency is lower than the first driving frequency, the panel driver provides data voltages to the first and second partial panel regions in a first frame period, provides the data voltages to the first partial panel region in a second frame period, determines a voltage level of a blank voltage for the second partial panel region, and provides the blank voltage to the second partial panel region in the second frame period.

In an embodiment, in the first frame period, data writing and biasing operations for pixels of the first and second partial panel regions may be performed based on the data voltages. In such an embodiment, in the second frame period, the data writing and biasing operations for the pixels of the first partial panel region may be performed based on the data voltages, and biasing operations for the pixels of the second partial panel region may be performed based on the blank voltage.

In embodiments, in the first frame period, by the data writing and biasing operations, voltages generated by subtracting threshold voltages of driving transistors of the pixels of the first and second partial panel regions from the data voltages may be stored in storage capacitors of the pixels of the first and second partial panel regions, and first on-biases based on the data voltages may be applied to the driving transistors of the pixels of the first and second partial panel regions. In such an embodiment, in the second frame period, by the data writing and biasing operations, the voltages generated by subtracting the threshold voltages of the driving transistors of the pixels of the first partial panel region from the data voltages may be stored in the storage capacitors of the pixels of the first partial panel region, and the first on-biases based on the data voltages may be applied to the driving transistors of the pixels of the first partial panel region. In such an embodiment, in the second frame period, by the biasing operations, second on-biases based on the blank voltage may be applied to the driving transistors of the pixels of the second partial panel region.

In an embodiment, the panel driver may determine the voltage level of the blank voltage for the second partial panel region as a voltage level of the data voltage corresponding to a gray level higher than a black gray level.

In an embodiment, the panel driver may divide input image data for the display panel into first partial image data for the first partial panel region and second partial image data for the second partial panel region, and may determine the voltage level of the blank voltage for the second partial panel region by analyzing the second partial image data for the second partial panel region.

In an embodiment, the panel driver may determine a maximum gray level of gray levels represented by the second partial image data for the second partial panel region, and may determine the voltage level of the blank voltage for the second partial panel region as a voltage level of the data voltage corresponding to the maximum gray level.

In embodiments, the panel driver may determine a maximum gray level of gray levels represented by the second partial image data for the second partial panel region, and may determine the voltage level of the blank voltage for the second partial panel region as a voltage level of the data voltage corresponding to a gray level higher than a black gray level and lower than the maximum gray level.

In an embodiment, the panel driver may determine an average gray level of gray levels represented by the second partial image data for the second partial panel region, and may determine the voltage level of the blank voltage for the second partial panel region as a voltage level of the data voltage corresponding to the average gray level.

In an embodiment, the panel driver may divide input image data for the display panel into first partial image data for the first partial panel region and second partial image data for the second partial panel region, and may determine the voltage level of the blank voltage for the second partial panel region by analyzing the first partial image data for the first partial panel region.

In an embodiment, the panel driver may determine the voltage level of the blank voltage for the second partial panel region based on a maximum gray level or an average gray level of gray levels represented by the first partial image data for the first partial panel region.

In an embodiment, each pixel in the first and second partial panel regions may include a driving transistor which generates a driving current, a switching transistor which transfers the data voltage or the blank voltage to a source of the driving transistor in response to a gate writing signal, a compensation transistor which diode-connects the driving transistor in response to a gate compensation signal, a storage capacitor which stores a voltage generated by subtracting a threshold voltage of the driving transistor from the data voltage, a first initialization transistor which provides a first initialization voltage to the storage capacitor and a gate of the driving transistor in response to a gate initialization signal, a first emission transistor which couples a line of a power supply voltage to the source of the driving transistor in response to an emission signal, a second emission transistor which couples a drain of the driving transistor to an organic light emitting diode in response to the emission signal, a second initialization transistor which provides a second initialization voltage to the organic light emitting diode in response to the gate writing signal for a next pixel row, and the organic light emitting diode which emits light based on the driving current.

In an embodiment, at least one selected from the driving, switching, compensation, first initialization, first emission, second emission and second initialization transistors may be implemented with a p-type metal-oxide-semiconductor ("PMOS") transistor, and at least one selected from the driving, switching, compensation, first initialization, first emission, second emission and second initialization transistors may be implemented with an n-type metal-oxide-semiconductor ("NMOS") transistor.

In an embodiment, the panel driver may include a data driver which provides the data voltages or the blank voltage to the display panel, a scan driver which provides a gate initialization signal, a gate writing signal and a gate compensation signal to the display panel, an emission driver which provides an emission signal to the display panel, and a controller which controls the data driver, the scan driver and the emission driver, determines the first and second driving frequencies for the first and second partial panel regions, and determines the voltage level of the blank voltage for the second partial panel region.

In an embodiment, the controller may include a still image detector which divides input image data for the display panel into first partial image data for the first partial panel region and second partial image data for the second partial panel region, and determines whether each of the first and second partial image data represent a still image, a driving frequency decider which determines the first driving frequency for the first partial panel region according to whether the first partial image data represent the still image, and determines the second driving frequency for the second partial panel region according to whether the second partial image data represent the still image, and a blank voltage decider which determines the voltage level of the blank voltage.

In an embodiment, in a case where the first partial image data represent a moving image and the second partial image data represent the still image, the driving frequency decider may determine the first driving frequency as a normal driving frequency, and determine the second driving frequency as a low frequency lower than the normal driving frequency. In such an embodiment, the scan driver may provide the gate initialization signal, the gate writing signal and the gate compensation signal to each pixel of the first partial panel region at the normal driving frequency. In such an embodiment, the scan driver may provide the gate writing signal at the normal driving frequency to each pixel of the second panel region, and may provide the gate initialization signal and the gate compensation signal at the low frequency to each pixel of the second panel region.

In an embodiment, the display device may be a foldable display device, and a boundary between the first partial panel region and the second partial panel region may correspond to a folding line of the foldable display device.

According to an embodiment, a method of operating a display device includes: determining a first driving frequency for a first partial panel region of a display panel and a second driving frequency for a second partial panel region of the display panel; providing data voltages to the first and second partial panel regions in a first frame period in a case where the second driving frequency is lower than the first driving frequency; providing the data voltages to the first partial panel region in a second frame period in the case where the second driving frequency is lower than the first driving frequency; determining a voltage level of a blank voltage for the second partial panel region in the case where the second driving frequency is lower than the first driving frequency; and providing the blank voltage to the second partial panel region in the second frame period in the case where the second driving frequency is lower than the first driving frequency.

In an embodiment, the voltage level of the blank voltage for the second partial panel region may be determined as a voltage level of the data voltage corresponding to a gray level higher than a black gray level.

In an embodiment, input image data for the display panel may be divided into first partial image data for the first partial panel region and second partial image data for the second partial panel region, and the voltage level of the blank voltage for the second partial panel region may be determined by analyzing the second partial image data for the second partial panel region.

In an embodiment, input image data for the display panel may be divided into first partial image data for the first partial panel region and second partial image data for the second partial panel region, and the voltage level of the blank voltage for the second partial panel region may be determined by analyzing the first partial image data for the first partial panel region.

As described above, in embodiments of a display device and a method of operating the display device, a first driving frequency for a first partial panel region of a display panel and a second driving frequency for a second partial panel region of the display panel may be determined. In such embodiments, in a case where the second driving frequency is lower than the first driving frequency, data voltages may be provided to the first and second partial panel regions in a first frame period. In such embodiments, in a second frame period, the data voltages may be provided to the first partial panel region, a voltage level of a blank voltage for the second partial panel region may be determined, and the blank voltage may be provided to the second partial panel region. Accordingly, since the first and second partial panel regions are driven at different driving frequencies from each other, power consumption of the display device may be reduced. In such embodiments, a biasing operation for pixels in the second partial panel region may be performed based on not a black data voltage but the blank voltage, and thus a luminance difference between the first and second partial panel regions driven at the different driving frequencies may be reduced.

BRIEF DESCRIPTION OF THE DRAWINGS

The above and other features of the invention will become more apparent by describing in further detail embodiments thereof with reference to the accompanying drawings.

DETAILED DESCRIPTION

Figure 1:
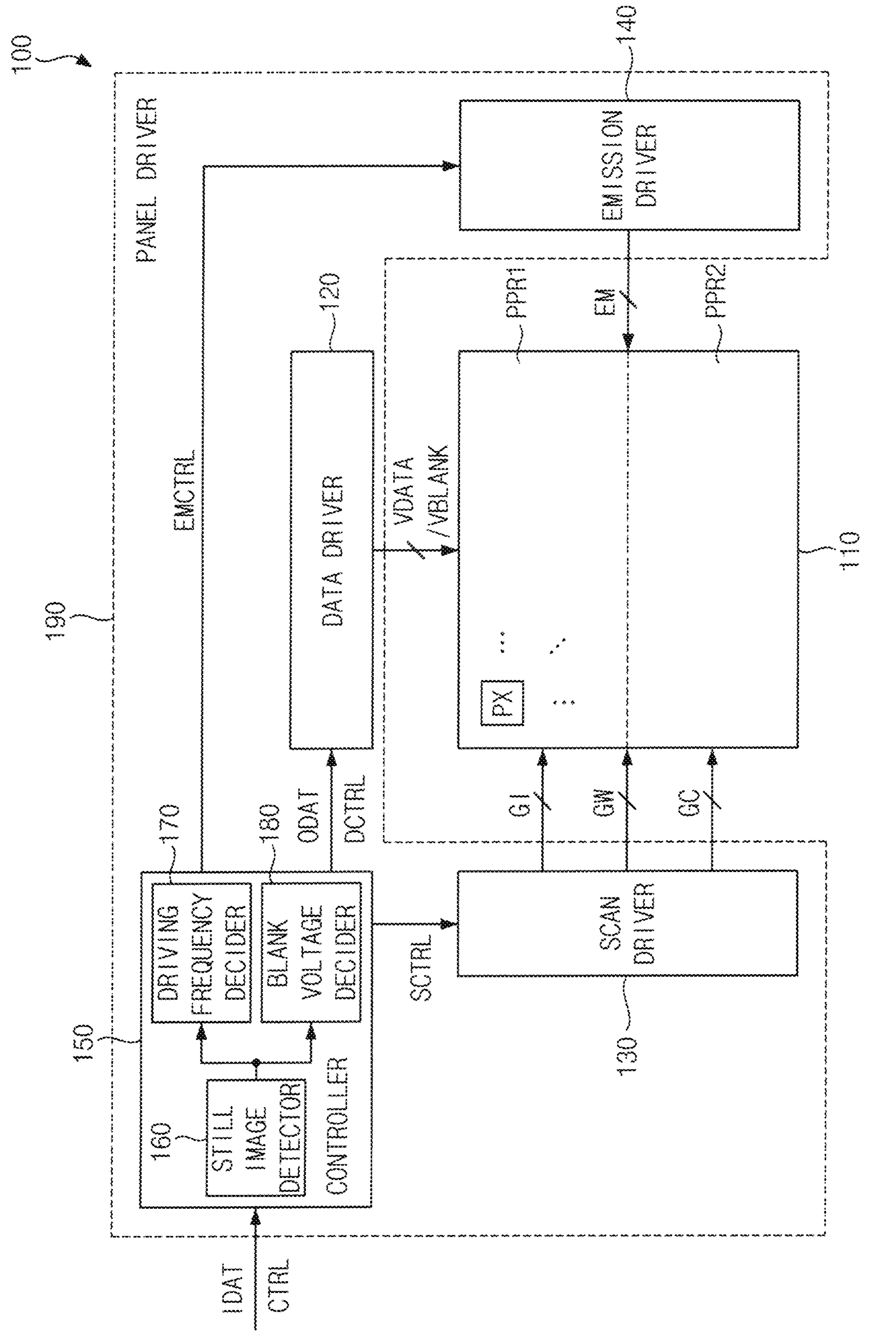
FIG. 1 is a block diagram illustrating a display device according to an embodiment.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, "a", "an," "the," and "at least one" do not denote a limitation of quantity, and are intended to include both the singular and plural, unless the context clearly indicates otherwise. For example, "an element" has the same meaning as "at least one element," unless the context clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10% or 5% of the stated value.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, embodiments of the invention will be described in detail with reference to the accompanying drawings.

Figure 2A:
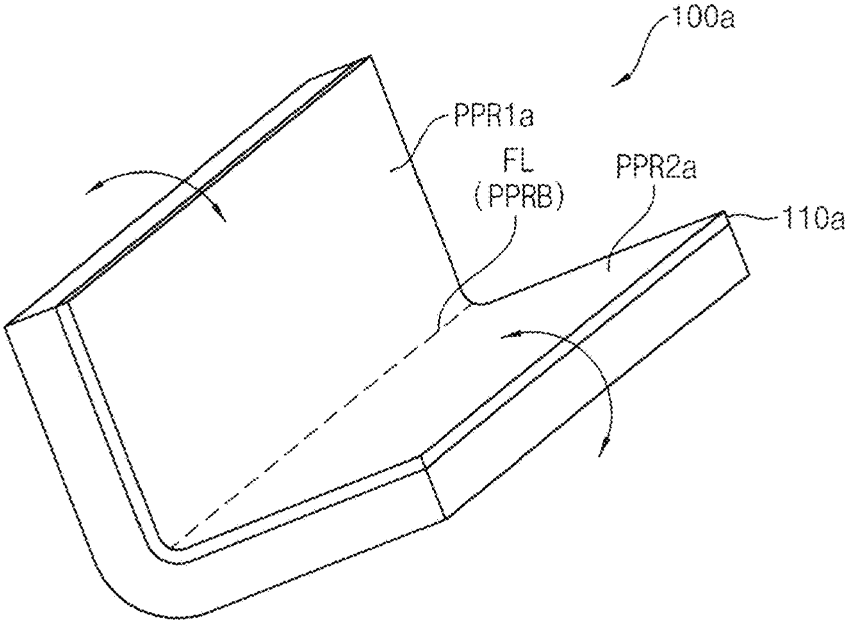
FIG. 2A is a diagram illustrating an embodiment where a display device of FIG. 1 is an in-folding display device.
Figure 2B:
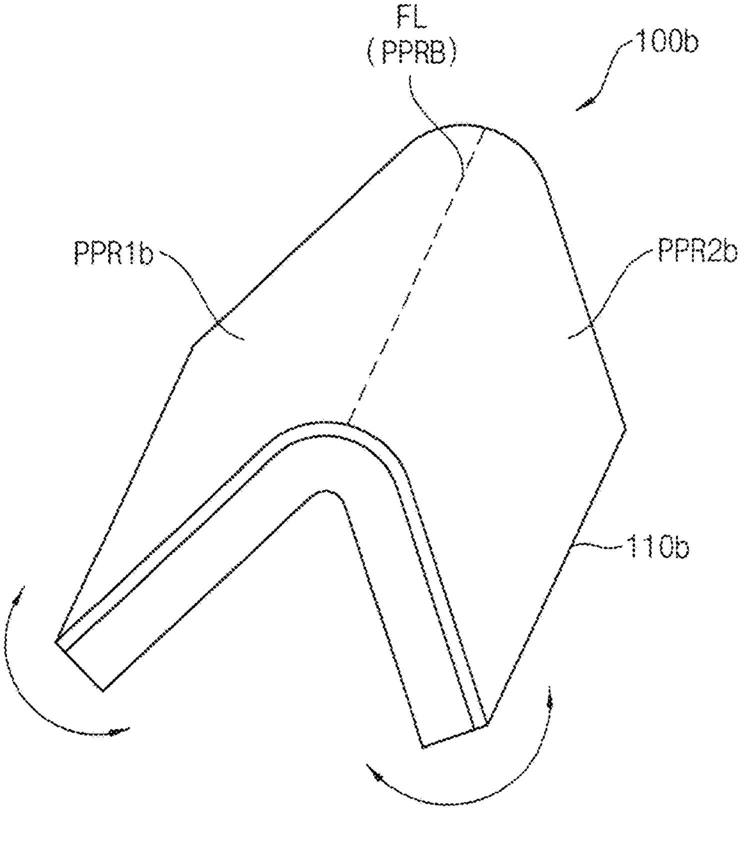
FIG. 2B is a diagram illustrating an embodiment where a display device of FIG. 1 is an out-folding display device.
Figure 3:
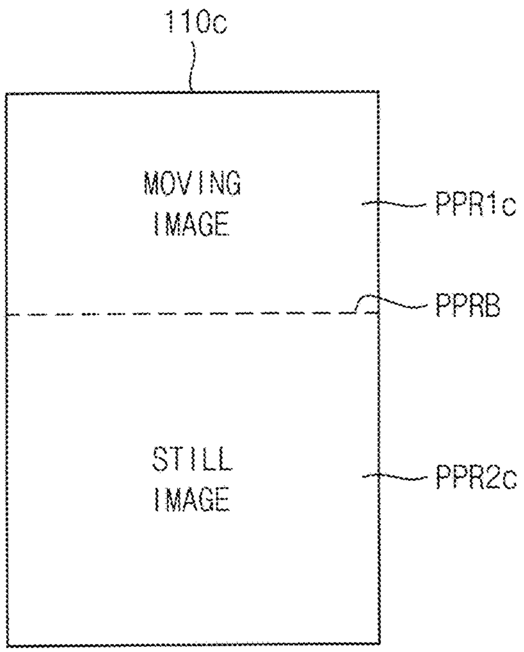
FIG. 3 is a diagram illustrating an embodiment where a portion of a display panel in which a moving image is displayed is set as a first partial panel region and another portion of the display panel in which a still image is displayed is set as a second partial panel region.
Figure 4:
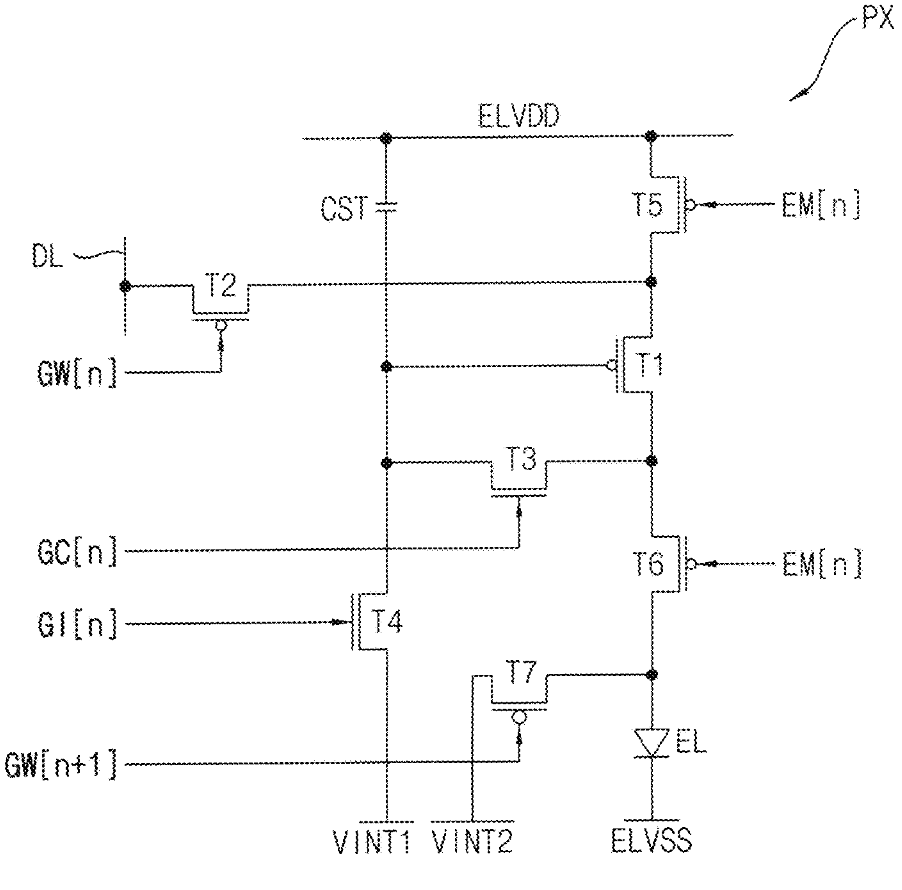
FIG. 4 is a circuit diagram illustrating an embodiment of a pixel included in a display device according to embodiments.
Figure 5:
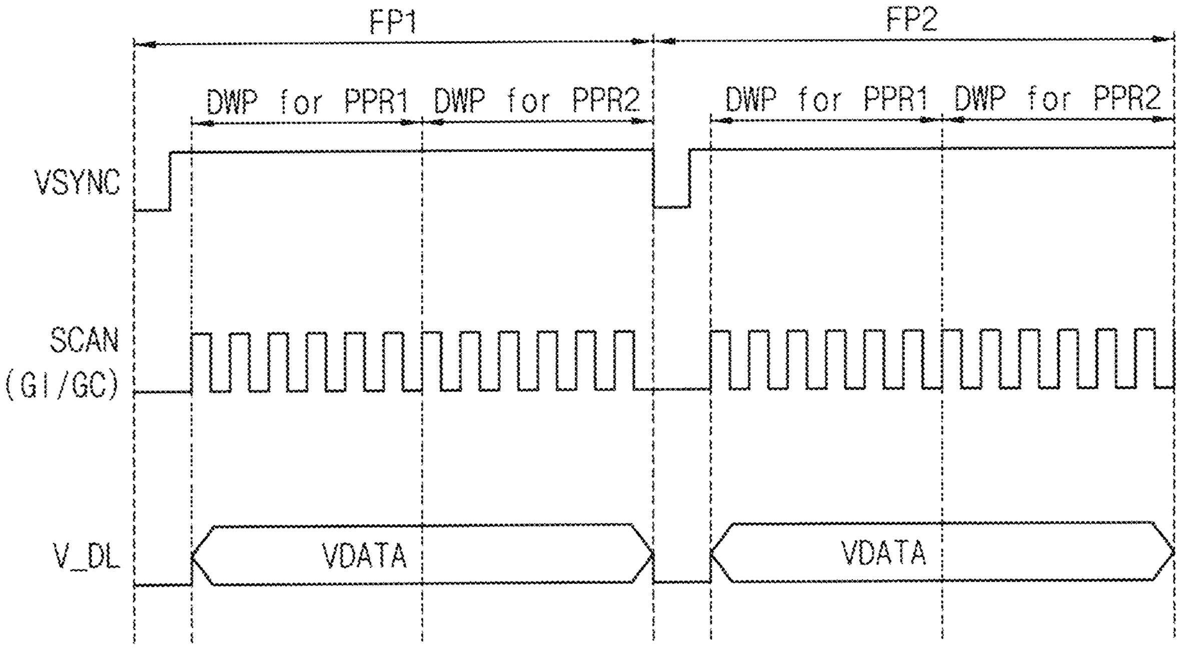
FIG. 5 is a timing diagram for describing an embodiment of an operation of a display device where all of first and second partial panel regions are driven at a normal driving frequency.
Figure 6:
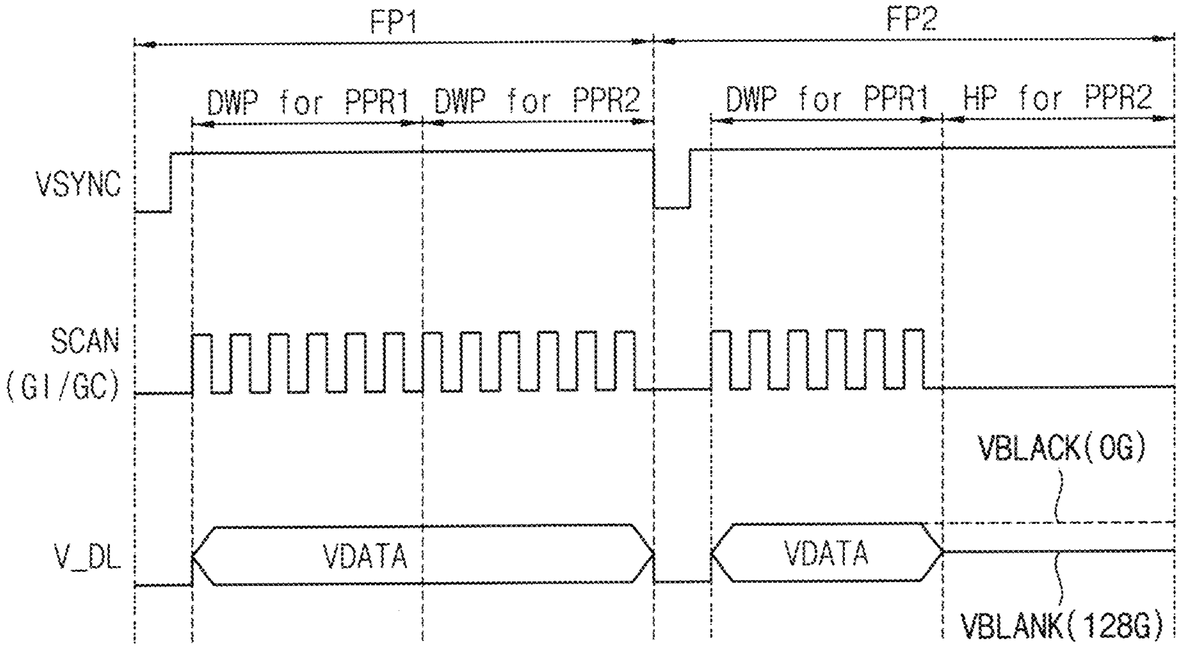
FIG. 6 is a timing diagram for describing an embodiment of an operation of a display device where a first partial panel region is driven at a normal driving frequency and a second partial panel region is driven at a low frequency.
Figure 7:
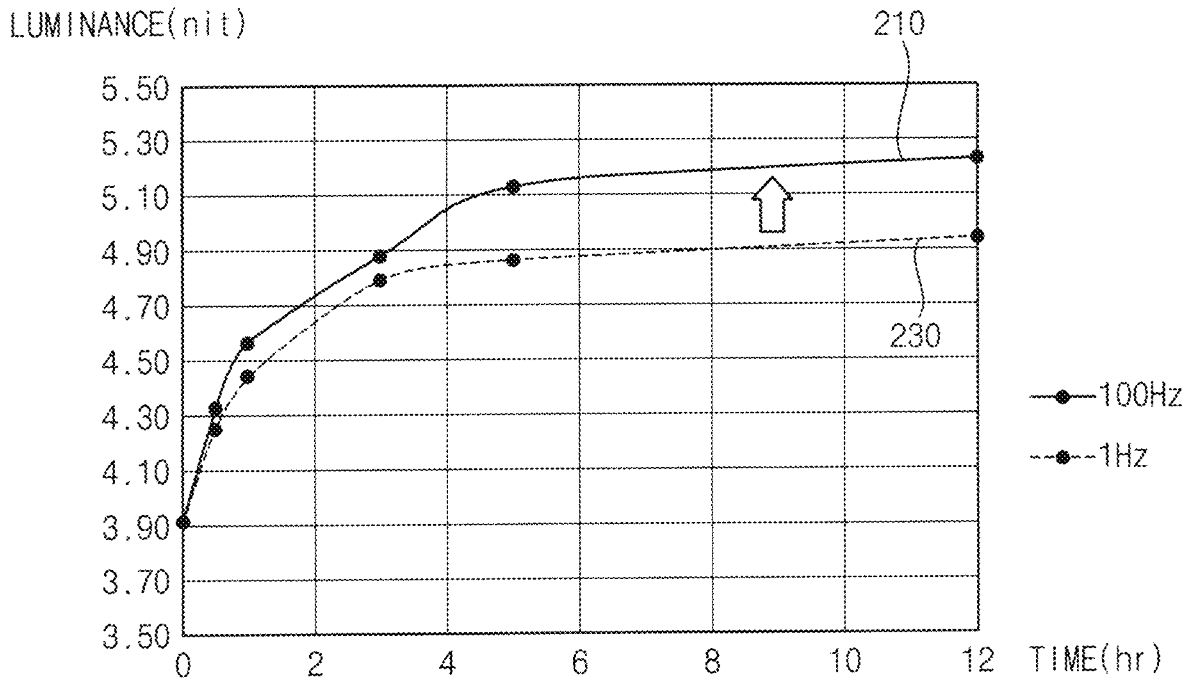
FIG. 7 is a diagram illustrating an embodiment of luminances of a first partial panel region driven at a normal driving frequency and a second partial panel region driven at a low frequency over a driving time.

FIG. 1 is a block diagram illustrating a display device according to embodiments, FIG. 2A is a diagram illustrating an embodiment where a display device of FIG. 1 is an in-folding display device, FIG. 2B is a diagram illustrating an embodiment where a display device of FIG. 1 is an out-folding display device, FIG. 3 is a diagram illustrating an embodiment where a portion of a display panel in which a moving image is displayed is set as a first partial panel region and another portion of the display panel in which a still image is displayed is set as a second partial panel region, FIG. 4 is a circuit diagram illustrating an embodiment of a pixel included in a display device according to embodiments, FIG. 5 is a timing diagram for describing an embodiment of an operation of a display device where all of first and second partial panel regions are driven at a normal driving frequency, FIG. 6 is a timing diagram for describing an embodiment of an operation of a display device where a first partial panel region is driven at a normal driving frequency and a second partial panel region is driven at a low frequency, and FIG. 7 is a diagram illustrating an embodiment of luminances of a first partial panel region driven at a normal driving frequency and a second partial panel region driven at a low frequency over a driving time.

Referring to FIG. 1, an embodiment of a display device 100 may include a display panel 110, and a panel driver 190 that drives the display panel 110. In an embodiment, the panel driver 190 may include a data driver 120 that provides data voltages VDATA or a blank voltage VBLANK to the display panel 110, a scan driver 130 that provides gate initialization signals GI, gate writing signals GW and gate compensation signals GC to the display panel 110, an emission driver 140 that provides emission signals EM to the display panel 110, and a controller 150 that controls the data driver 120, the scan driver 130 and the emission driver 140.

The display panel 110 may include a first partial panel region PPR1 and a second partial panel region PPR2. In one embodiment, for example, the display panel 110 may be divided into the first partial panel region PPR1 and the second partial panel region PPR2, and each of the first and second partial panel regions PPR1 and PPR2 includes two or more scan lines, or two or more pixel rows connected to the two or more scan lines.

In an embodiment, the first partial panel region PPR1 and the second partial panel region PPR2 may have fixed partial regions within the display panel 110. In one embodiment, for example, the display device 100 may be a foldable display device, and a boundary between the first partial panel region PPR1 and the second partial panel region PPR2 may correspond to a folding line of the foldable display device.

In an embodiment, as illustrated in FIG. 2A, the display device 100 may be an in-folding display device 100*a* including an in-folding display panel 110*a* that is folded such that the first and second partial panel regions PPR1*a* and PPR2*a* face each other, and the boundary PPRB between the first and second partial panel regions PPR1*a* and PPR2*a* may have a fixed position corresponding to a folding line FL at which the in-folding display panel 110*a* is folded. In an alternative embodiment, as illustrated in FIG. 2B, the display device 100 may be an out-folding display device 100*b* including an out-folding display panel 110*b* that is folded such that one of the first and second partial panel regions PPR1*b* and PPR2*b* is located at a front side and the other one of the first and second partial panel regions PPR1*b* and PPR2*b* is located at a back or rear side, and the boundary PPRB between the first and second partial panel regions PPR1*b* and PPR2*b* may have a fixed position corresponding to a folding line FL at which the out-folding display panel 110*b* is folded. Although FIGS. 2A and 2B illustrate embodiments where the display device 100 is a foldable display device 100*a* or 100*b*, the embodiments are not limited thereto. In an alternative embodiment, the display device 100 may be any flexible display device, such as a curved display device, a bended display device, a rollable display device, a stretchable display device, etc. In another alternative embodiment, the display device 100 may be a flat (e.g., rigid) display device.

In an embodiment, the first partial panel region PPR1 and the second partial panel region PPR2 may be dynamically changed within the display panel 110. In one embodiment, for example, as illustrated in FIG. 3, in a case where a moving image is displayed in a portion of the display panel 110*c*, and a still image is displayed in another portion of the display panel 110*c*, the first partial panel region PPR1*c* may be set as the portion of the display panel 110*c* in which the moving image is displayed, and the second partial panel region PPR2*c* may be set as the another portion of the display panel 110*c* in which the still image is displayed. In this case, to set the first and second partial panel regions PPR1*c* and PPR2*c*, the controller 150 may divide the display panel 110*c* into the portion of the display panel 110*c* in which the moving image is displayed and the another portion of the display panel 110*c* in which the still image is displayed by analyzing input image data IDAT.

Although FIGS. 1 through 3 illustrate embodiments where the display panel 110 is divided into two partial panel regions PPR1 and PPR2, the embodiments are not limited thereto. In an alternative embodiment, the display panel 110 may be divided into three or more partial panel regions that may be driven at different driving frequencies.

The display panel 110 may include a plurality of data lines, a plurality of scan lines, a plurality of emission lines and a plurality of pixels PX coupled thereto. In such an embodiment, each of the first partial panel region PPR1 and the second partial panel region PPR2 may include the plurality of pixels PX. In an embodiment, the plurality of scan lines may include a plurality of gate initialization lines, a plurality of gate writing lines and a plurality of gate compensation lines. In such an embodiment, each pixel PX may include at least one capacitor, at least two transistors and an organic light emitting diode ("OLED"), and the display panel 110 may be an OLED display panel. In an embodiment, each pixel PX may be a hybrid oxide polycrystalline ("HOP") pixel suitable for low frequency driving capable of reducing power consumption. In one embodiment, for example, in the HOP pixel, at least one first transistor may be implemented with a low-temperature polycrystalline silicon ("LTPS") p-type metal-oxide-semiconductor ("PMOS") transistor, and at least one second transistor may be implemented with an oxide n-type metal-oxide-semiconductor ("NMOS") transistor.

In one embodiment, for example, as illustrated in FIG. 4, each pixel PX may include a driving transistor T1 that generates a driving current, a switching transistor T2 that transfers the data voltage VDATA or the blank voltage VBLANK to a source of the driving transistor T1 in response to the gate writing signal GW[n], a compensation transistor T3 that diode-connects the driving transistor T1 in response to the gate compensation signal GC[n], a storage capacitor CST that stores a voltage generated by subtracting a threshold voltage of the driving transistor T1 from the data voltage VDATA, a first initialization transistor T4 that provides a first initialization voltage VINT1 to the storage capacitor CST and a gate of the driving transistor T1 in response to the gate initialization signal GI[n], a first emission transistor T5 that couples or connects a line of a first power supply voltage ELVDD to the source of the driving transistor T1 in response to an emission signal EM[n], a second emission transistor T6 that couples or connects a drain of the driving transistor T1 to an organic light emitting diode EL in response to the emission signal EM[n], a second initialization transistor T7 that provides a second initialization voltage VINT2 to the organic light emitting diode EL in response to the gate writing signal GW[n+1] for the next pixel row, or the pixels PX in the next row, and the organic light emitting diode EL that emits light based on the driving current flowing from the line of the first power supply voltage ELVDD to a line of a second power supply voltage ELVSS. According to an embodiment, the first initialization voltage VINT1 and the second initialization voltage VINT2 may be substantially a same voltage as each other, or may be different voltages from each other.

At least one selected from the driving transistor T1, the switching transistor T2, the compensation transistor T3, the first initialization transistor T4, the first emission transistor T5, the second emission transistor T6 and the second initialization transistor T7 may be implemented with a PMOS transistor, and at least one selected from the driving transistor T1, the switching transistor T2, the compensation transistor T3, the first initialization transistor T4, the first emission transistor T5, the second emission transistor T6 and the second initialization transistor T7 may be implemented with an NMOS transistor. In one embodiment, for example, as illustrated in FIG. 4, the compensation transistor T3 and the first initialization transistor T4 may be implemented with the NMOS transistors, and other transistors T1, T2, T5, T6 and T7 may be implemented with the PMOS transistors. In this case, the gate compensation signal GC[n] applied to the compensation transistor T3 and the gate initialization signal GI[n] applied to the first initialization transistor T4 may be active high signals suitable for the NMOS transistors. In such an embodiment, since the compensation and first initialization transistors T3 and T4 directly coupled to the storage capacitor CST are implemented with the NMOS transistors, leakage currents from/to the storage capacitor CST may be reduced, and thus the pixel PX may be suitable for the low frequency driving. Although FIG. 4 illustrates an embodiment where the compensation transistor T3 and the first initialization transistor T4 are implemented with the NMOS transistors, a configuration of each pixel PX according to embodiments is not limited to that shown in FIG. 4. In an alternative embodiment, the display panel 110 may be a liquid crystal display ("LCD") panel, or any other type of display panel.

Referring back to FIG. 1, the data driver 120 may generate the data voltages VDATA based on output image data ODAT and a data control signal DCTRL received from the controller 150, and may provide the data voltages VDATA to the plurality of pixels PX through the plurality of data lines in a data writing period. In an embodiment, the data driver 120 may provide the blank voltage VBLANK to the pixels PX driven a low frequency through the plurality of data lines in a holding period. The data control signal DCTRL may include a blank voltage level signal indicating a voltage level of the blank voltage VBLANK. In an embodiment, the data control signal DCTRL may include, but not limited to, an output data enable signal, a horizontal start signal and a load signal. In an embodiment, the data driver 120 and the controller 150 may be implemented with a single integrated circuit, and the integrated circuit may be referred to as a timing controller embedded data driver ("TED"). In an alternative embodiment, the data driver 120 and the controller 150 may be implemented with separate integrated circuits, respectively.

The scan driver 130 may generate scan signals GI, GW and GC based on a scan control signal SCTRL received from the controller 150, and may sequentially provide the scan signals GI, GW and GC to the plurality of pixels PX on a row-by-row basis through the plurality of scan lines. In an embodiment, the scan signals GI, GW and GC may include the gate initialization signals GI, the gate writing signals GW and the gate compensation signals GC. In one embodiment, for example, with respect to the pixels PX in each row, the scan driver 130 may apply the gate initialization signal GI to the pixels PX, and then may apply the gate writing signal GW and the gate compensation signal GC to the pixels PX. In an embodiment, in the holding period, the scan driver 130 may not apply the gate initialization signal GI and the gate compensation signal GC to the pixels PX driven at the low frequency, and may apply only the gate writing signal GW to the pixels PX driven at the low frequency. In an embodiment, the scan control signal SCTRL may include, but not limited to, a scan start signal and a scan clock signal. In an embodiment, the scan driver 130 may be integrated or formed in a peripheral portion of the display panel 110. In an alternative embodiment, the scan driver 130 may be implemented with one or more integrated circuits.

The emission driver 140 may generate the emission signals EM based on an emission control signal EMCTRL received from the controller 150, and may sequentially provide the emission signals EM to the plurality of pixels PX on a row-by-row basis through the plurality of emission lines. In an embodiment, the emission control signal EMCTRL may include, but not limited to, an emission start signal and an emission clock signal. In an embodiment, the emission driver 140 may be integrated or formed in a peripheral portion of the display panel 110. In an alternative embodiment, the emission driver 140 may be implemented with one or more integrated circuits.

The controller (e.g., a timing controller ("TCON")) 150 may receive the input image data IDAT and a control signal CTRL from an external host (e.g., a graphic processing unit (GPU) or a graphic card). In an embodiment, the control signal CTRL may include, but not limited to, a vertical synchronization signal, a horizontal synchronization signal, an input data enable signal, a master clock signal, etc. The controller 150 may generate the output image data ODAT, the data control signal DCTRL, the scan control signal SCTRL and the emission control signal EMCTRL based on the input image data IDAT and the control signal CTRL. The controller 150 may control an operation of the data driver

120 by providing the output image data ODAT and the data control signal DCTRL to the data driver 120, may control an operation of the scan driver 130 by providing the scan control signal SCTRL to the scan driver 130, and may control an operation of the emission driver 140 by providing the emission control signal EMCTRL to the emission driver 140.

In an embodiment, the panel driver 190 of the display device 100 may determine a first driving frequency for the first partial panel region PPR1 and a second driving frequency for the second partial panel region PPR2. In an embodiment, the first and second driving frequencies may be different from each other, and the panel driver 190 may perform multi-frequency driving ("MFD") that drives the first and second partial panel regions PPR1 and PPR2 at the first and second driving frequencies, which are different from each other. In one embodiment, for example, in a case where a moving image is displayed in the first partial panel region PPR1, and a still image is displayed in the second partial panel region PPR2, the panel driver 190 may determine the first driving frequency for the first partial panel region PPR1 as a normal driving frequency (e.g., about 60 Hz, about 100 Hz, about 120 Hz, etc.), may determine the second driving frequency as the low frequency lower than the normal driving frequency, may drive the first partial panel region PPR1 at the normal driving frequency, and may drive the second partial panel region PPR2 at the low frequency. In an embodiment, the controller 150 of the panel driver 190 may include a still image detector 160 and a driving frequency decider 170 to determine the first and second driving frequencies for the first and second partial panel regions PPR1 and PPR2.

The still image detector 160 may divide the input image data IDAT for the display panel 110 into first partial image data for the first partial panel region PPR1 and second partial image data for the second partial panel region PPR2, and may determine whether each of the first and second partial image data represent a still image. In an embodiment, the still image detector 160 may determine whether the first partial image data represent the still image by comparing the first partial image data in a previous frame period and the first partial image data in a current frame period, and may determine whether the second partial image data represent the still image by comparing the second partial image data in the previous frame period and the second partial image data in the current frame period.

The driving frequency decider 170 may determine the first driving frequency for the first partial panel region PPR1 according to whether the first partial image data represent the still image, and may determine the second driving frequency for the second partial panel region PPR2 according to whether the second partial image data represent the still image. In an embodiment, the driving frequency decider 170 may determine the first driving frequency for the first partial panel region PPR1 as the normal driving frequency (e.g., about 60 Hz, about 100 Hz, about 120 Hz, etc.) when the first partial image data do not represent the still image (or when the first partial image data represent a moving image), and may determine the first driving frequency for the first partial panel region PPR1 as the low frequency lower than the normal driving frequency when the first partial image data represent the still image. In such an embodiment, the driving frequency decider 170 may determine the second driving frequency for the second partial panel region PPR2 as the normal driving frequency when the second partial image data do not represent the still image (or when the second partial image data represent the moving image), and may determine the second driving frequency for the second partial panel region PPR2 as the low frequency lower than the normal driving frequency when the second partial image data represent the still image. In an embodiment, in a case where the second partial image data represent the still image, the driving frequency decider 170 may determine a flicker value (that represents a level of a flicker perceived by a user) according to a gray level (or luminance) of the second partial image data by using a flicker lookup table that stores flicker values corresponding to respective gray levels, and may determine the second driving frequency according to the flicker value. In such an embodiment, determining the flicker value may be performed on a pixel-by-pixel basis, a segment-by-segment basis, or a partial panel region-by-partial panel region basis.

In a case where all of the first and second driving frequencies for the first and second partial panel regions PPR1 and PPR2 are determined as the normal driving frequency by the still image detector 160 and the driving frequency decider 170, the panel driver 190 may drive the first and second partial panel regions PPR1 and PPR2 at the normal driving frequency. In one embodiment, for example, as illustrated in FIG. 5, in each frame period FP1 and FP2 defined by the vertical synchronization signal VSYNC, the scan driver 130 may provide the scan signals SCAN, or the gate initialization signal GI, the gate writing signal GW and the gate compensation signal GC to each pixel PX of the first and second partial panel regions PPR1 and PPR2, and the data driver 120 may provide the data voltage VDATA corresponding to the output image data ODAT as a voltage V_DL of the data line DL to each pixel PX of the first and second partial panel regions PPR1 and PPR2. Since the gate initialization, writing and compensation signals GI, GW and GC are provided to each pixel PX in each frame period FP1 and FP2, the gate initialization, writing and compensation signals GI, GW and GC may be provided to each pixel PX at the normal driving frequency.

Figure 10:
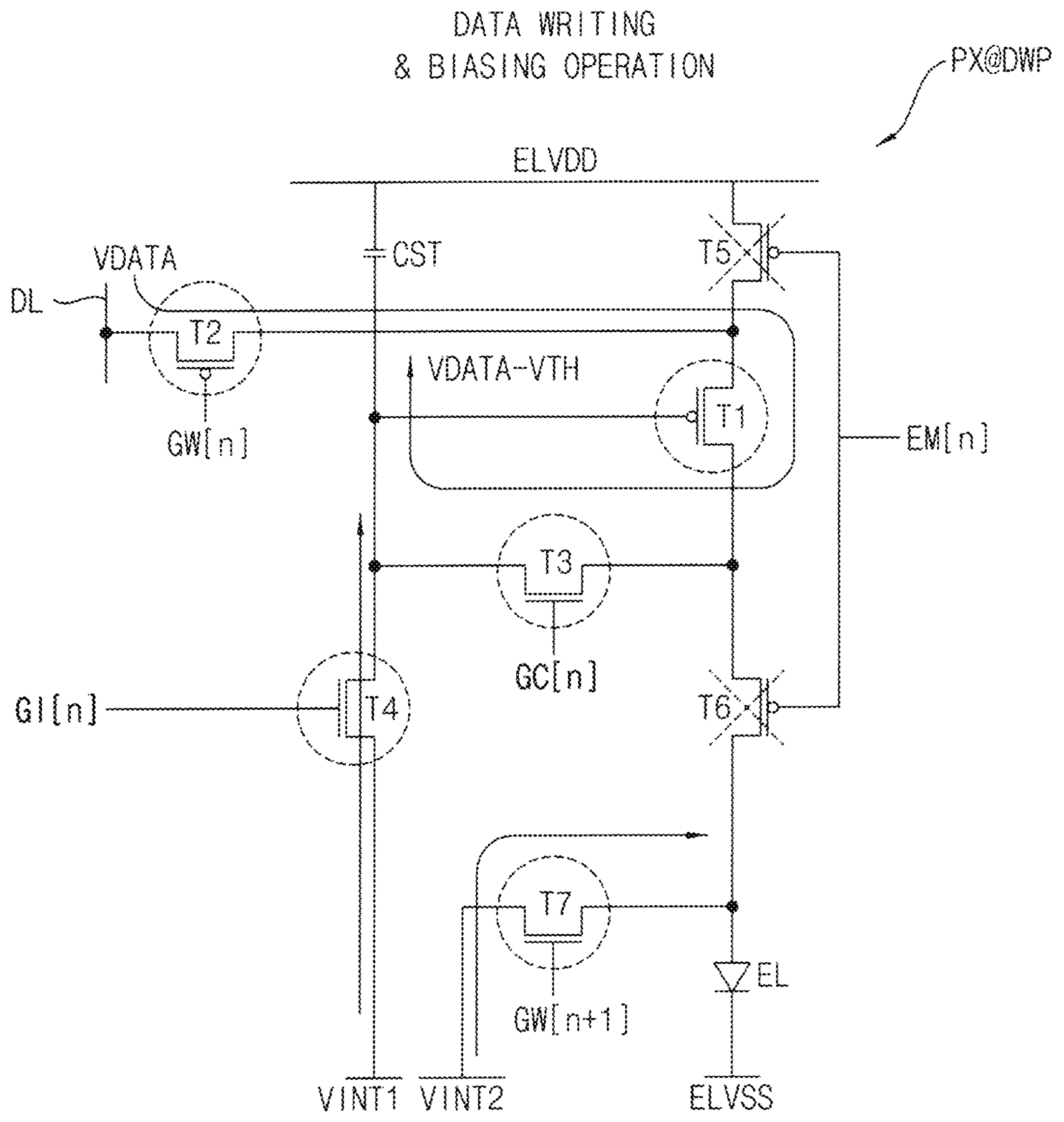
FIG. 10 is a diagram for describing an embodiment of a data writing and biasing operation of a pixel in a data writing period.

In an embodiment, the gate initialization signal GI may be first applied to each pixel PX, and then the gate writing signal GW and the gate compensation signal GC along with the data voltage VDATA may be applied to each pixel PX. While the gate writing signal GW, the gate compensation signal GC and the data voltage VDATA are applied to each pixel PX, a data writing and biasing operation for the pixel PX may be performed based on the data voltage VDATA as illustrated in FIG. 10. By the data writing and biasing operation, as illustrated in FIG. 10, a voltage VDATA-VTH generated by subtracting a threshold voltage VTH of the driving transistor T1 of the pixel PX from the data voltage VDATA may be stored in the storage capacitor CST of the pixel PX, and a first on-bias based on the data voltage VDATA may be applied to the driving transistor T1 of the pixel PX. In one embodiment, for example, as the first on-bias based on the data voltage VDATA, the data voltage VDATA may be applied to the source of the driving transistor T1, and the voltage VDATA-VTH generated by subtracting the threshold voltage VTH from the data voltage VDATA may be applied to the gate of the driving transistor T1. The driving transistor T1 may be turned on based on the first on-bias, and a hysteresis of the driving transistor T1 may be initialized based on the first on-bias.

In a case where the first driving frequency for the first partial panel region PPR1 and the second driving frequency for the second partial panel region PPR2 are determined as the normal driving frequency and the low frequency lower than the normal driving frequency, respectively, by the still image detector 160 and the driving frequency decider 170, respectively, the panel driver 190 may drive the first partial panel region PPR1 at the normal driving frequency, and may drive the second partial panel region PPR2 at the low frequency. In one embodiment, for example, in a case where the normal driving frequency is about 60 Hz, and the low frequency is about 30 Hz, as illustrated in FIG. 6, the first partial panel region PPR1 may be driven at each of the first and second frame periods FP1 and FP2, and the second partial panel region PPR2 may be driven only at the first frame period FP1. Thus, with respect to the first partial panel region PPR1, in each of a data writing period DWP for the first partial panel region PPR1 in the first frame period FP1 and a data writing period DWP for the first partial panel region PPR1 in the second frame period FP2, the scan driver 130 may provide the gate initialization signal GI, the gate writing signal GW and the gate compensation signal GC to each pixel PX of the first partial panel region PPR1, and the data driver 120 may provide the data voltage VDATA corresponding to the output image data ODAT as the voltage V_DL of the data line DL to each pixel PX of the first partial panel region PPR1. Thus, in each of the first and second frame periods FP1 and FP2, the data writing and biasing operation for each pixel PX of the first partial panel region PPR1 may be performed based on the data voltage VDATA. Since the gate initialization, writing and compensation signals GI, GW and GC are provided to each pixel PX of the first partial panel region PPR1 in each frame period FP1 and FP2, the gate initialization, writing and compensation signals GI, GW and GC may be provided to each pixel PX of the first partial panel region PPR1 at the normal driving frequency.

However, to drive the second partial panel region PPR2 at the low frequency, a period allocated for the second partial panel region PPR2 within the first frame period FP1 may be set as the data writing period DWP, and a period allocated for the second partial panel region PPR2 within the second frame period FP2 may be set as a holding period HP. Although FIG. 6 illustrates an embodiment where the period allocated for the second partial panel region PPR2 within one frame period FP1 among two frame periods FP1 and FP2 is set as the holding period HP, the number of the holding period HP in consecutive frame periods FP1 and FP2 may be determined according to the normal driving frequency and the low frequency. In one embodiment, for example, in a case where the normal driving frequency is about 100 Hz, and the second driving frequency for the second partial panel region PPR2, or the low frequency is about 1 Hz, a period allocated for the second partial panel region PPR2 within one frame period among one hundred consecutive frame periods may be set as the data writing period DWP, and periods allocated for the second partial panel region PPR2 within the remaining ninety nine frame periods may be set as the holding periods HP. Accordingly, the second partial panel region PPR2 may be driven about 1 Hz.

In an embodiment shown in FIG. 6, with respect to the second partial panel region PPR2, in the data writing period DWP for the second partial panel region PPR2 in the first frame period FP1, the scan driver 130 may provide the gate initialization signal GI, the gate writing signal GW and the gate compensation signal GC to each pixel PX of the second partial panel region PPR2, and the data driver 120 may provide the data voltage VDATA corresponding to the output image data ODAT as the voltage V_DL of the data line DL to each pixel PX of the second partial panel region PPR2. Accordingly, in the first frame period FP1, the data writing and biasing operation for each pixel PX of the second partial panel region PPR2 may be performed based on the data voltage VDATA.

However, with respect to the second partial panel region PPR2, in the holding period HP for the second partial panel region PPR2 in the second frame period FP2, the scan driver 130 may not provide the gate initialization signal GI and the gate compensation signal GC to each pixel PX of the second partial panel region PPR2, the data driver 120 may not provide the data voltage VDATA to each pixel PX of the second partial panel region PPR2, and the data driver 120 may provide the blank voltage VBLANK as the voltage V_DL of the data line DL to each pixel PX of the second partial panel region PPR2. In an embodiment, in the holding period HP for the second partial panel region PPR2 in the second frame period FP2, the scan driver 130 may provide the gate writing signal GW to each pixel PX of the second partial panel region PPR2. Since the gate writing signal GW is provided to each pixel PX of the second partial panel region PPR2 in each frame period FP1 and FP2, and the gate initialization and compensation signals GI and GC are not provided to each pixel PX of the second partial panel region PPR2 only in the first frame period FP1, the gate writing signal GW may be provided to each pixel PX of the second partial panel region PPR2 at the normal driving frequency, and the gate initialization and compensation signals GI and GC may be provided to each pixel PX of the second partial panel region PPR2 at the low frequency.

Figure 11:
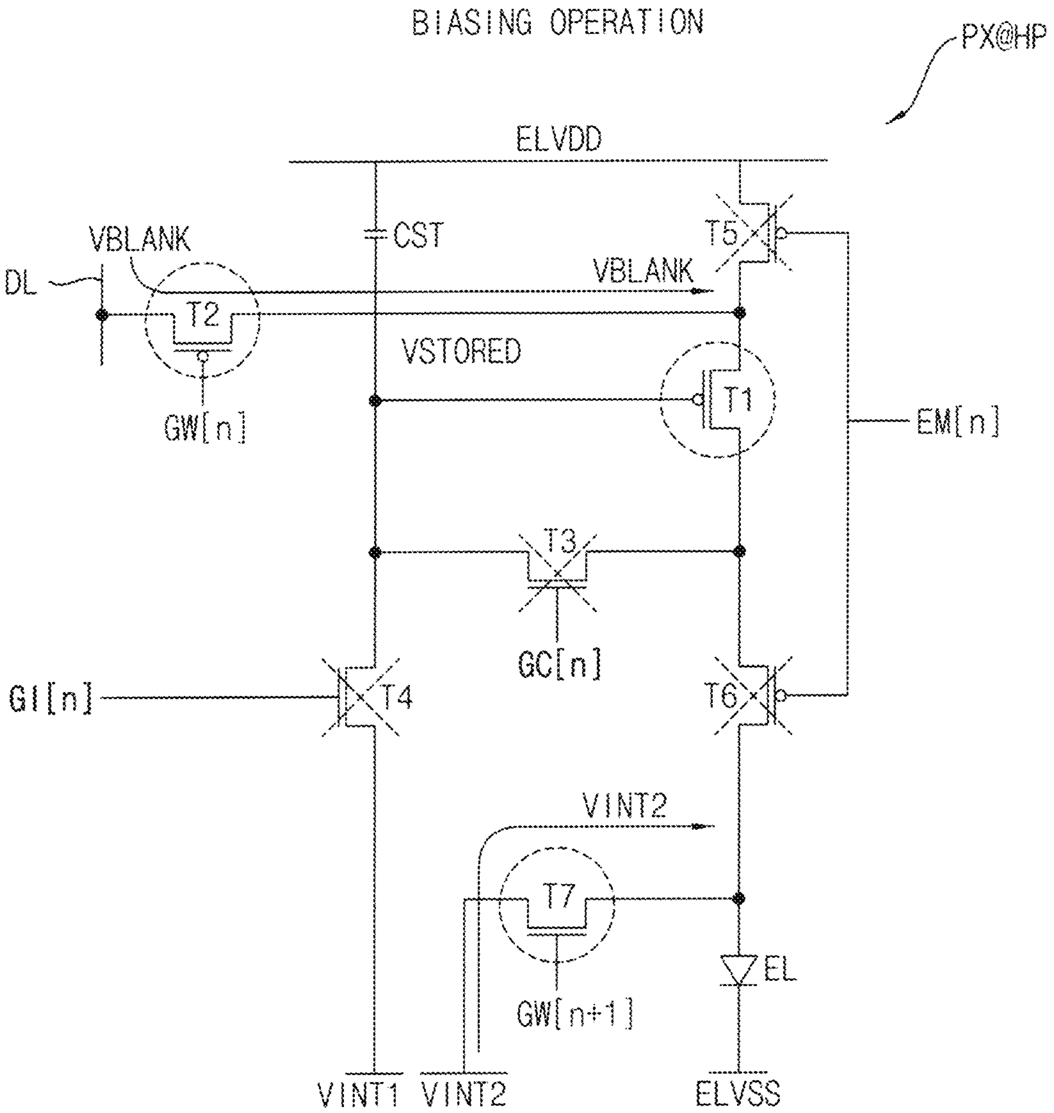
FIG. 11 is a diagram for describing an embodiment of a biasing operation of a pixel in a holding period.

In the holding period HP in which the gate initialization and compensation signals GI and GC are not provided to each pixel PX of the second partial panel region PPR2 and the gate writing signal GW and the blank voltage VBLANK are provided to each pixel PX of the second partial panel region PPR2, a biasing operation for the pixel PX may be performed based on the blank voltage VBLANK as illustrated in FIG. 11. By the biasing operation, as illustrated in FIG. 11, a second on-bias based on the blank voltage VBLANK may be applied to the driving transistor T1 of the pixel PX. In one embodiment, for example, as the second on-bias based on the blank voltage VBLANK, the blank voltage VBLANK may be applied to the source of the driving transistor T1, and a voltage VSTORED stored in the storage capacitor CST may be applied to the gate of the driving transistor T1. The driving transistor T1 may be turned on based on the second on-bias, and the hysteresis of the driving transistor T1 may be initialized based on the second on-bias.

In a case where the blank voltage VBLANK has a voltage level of the data voltage VDATA corresponding to a black gray level (e.g., the minimum gray level of 0 or 0 G), or a voltage level of a black data voltage VBLACK, the second on-bias based on the blank voltage VBLANK may be different from the first on-bias based on the data voltage VDATA, the hysteresis of the driving transistor T1 of the pixel PX to which the second on-bias is applied may be different from the hysteresis of the driving transistor T1 of the pixel PX to which the first on-bias is applied. In one embodiment, for example, as illustrated in FIG. 7, in a case where the first partial panel region PPR1 is driven at the first driving frequency that is the normal driving frequency of about 100 Hz, and the second partial panel region PPR2 is driven at the second driving frequency that is the low frequency of about 1 Hz, even if the first and second partial panel regions PPR1 and PPR2 display images corresponding to a same gray level (e.g., a gray level of 32), a luminance 210 of the first partial panel region PPR1 may be different from a luminance 230 of the second partial panel region PPR2. In such an embodiment, since each pixel PX of the first partial panel region PPR1 receives the first on-bias in each of one hundred frame periods, but the each pixel PX of the second partial panel region PPR2 receives the first on-bias in one frame period of the one hundred frame periods and receives the second on-bias in ninety nine frame periods of the one hundred frame periods, the hysteresis of the driving transistor T1 of the pixel PX of the first partial panel region PPR1 may be different from the hysteresis of the driving transistor T1 of the pixel PX of the second partial panel region PPR2. In such an embodiment, as a driving time of the display device 100 increases, a hysteresis difference between the driving transistors T1 of the first and second partial panel regions PPR1 and PPR2 may be increased, and a difference of the luminances 210 and 230 of the first and second partial panel regions PPR1 and PPR2 may be increased.

In an embodiment of the display device 100 according to the invention, as shown in FIG. 1, the controller 150 of the panel driver 190 may further include a blank voltage decider 180 that determines the voltage level of the blank voltage VBLANK for the second partial panel region PPR2. In an embodiment, the blank voltage decider 180 may determine the voltage level of the blank voltage VBLANK for the second partial panel region PPR2 as a voltage level of the data voltage VDATA corresponding to a gray level higher than the black gray level (0G). In one embodiment, for example, as illustrated in FIG. 6, the blank voltage decider 180 may determine the voltage level of the blank voltage VBLANK for the second partial panel region PPR2 as a voltage level of the data voltage VDATA corresponding to a 128-gray level (128G). In such an embodiment, a difference between the first on-bias based on the data voltage VDATA and the second on-bias based on the blank voltage VBLANK may be reduced, and the hysteresis difference between the driving transistors T1 of the first and second partial panel regions PPR1 and PPR2 may be reduced. Accordingly, as illustrated in FIG. 7, the luminance 230 of the second partial panel region PPR2 may be changed to be closer to the luminance 210 of the first partial panel region PPR1, and the difference of the luminances 210 and 230 of the first and second partial panel regions PPR1 and PPR2 may be reduced.

In an alternative embodiment, the input image data IDAT for the display panel 110 may be divided into the first partial image data for the first partial panel region PPR1 and the second partial image data for the second partial panel region PPR2, and the blank voltage decider 180 may determine the voltage level of the blank voltage VBLANK for the second partial panel region PPR2 by analyzing the second partial image data for the second partial panel region PPR2. In one embodiment, for example, the blank voltage decider 180 may determine the voltage level of the blank voltage VBLANK for the second partial panel region PPR2 based on a maximum gray level or an average gray level of gray levels represented by the second partial image data. In another alternative embodiment, the blank voltage decider 180 may determine the voltage level of the blank voltage VBLANK for the second partial panel region PPR2 by analyzing the first partial image data for the first partial panel region PPR1. In one embodiment, for example, the blank voltage decider 180 may determine the voltage level of the blank voltage VBLANK for the second partial panel region PPR2 based on a maximum gray level or an average gray level of gray levels represented by the first partial image data.

As described above, in embodiments of the display device 100 according to the invention, the first driving frequency for the first partial panel region PPR1 of the display panel 110 and the second driving frequency for the second partial panel region PPR2 of the display panel 110 may be determined. In a case where the second driving frequency is lower than the first driving frequency, the data voltages VDATA may be provided to the first and second partial panel regions PPR1 and PPR2 in the first frame period FP1. Further, in the second frame period FP2, the data voltages VDATA may be provided to the first partial panel region PPR1, the voltage level of the blank voltage VBLANK for the second partial panel region PPR2 may be determined, and the blank voltage VBLANK may be provided to the second partial panel region PPR2. Accordingly, in such an embodiment, the first and second partial panel regions PPR1 and PPR2 are driven at different driving frequencies from each other, such that power consumption of the display device 100 may be reduced. In such an embodiment, the biasing operation for the pixels PX in the second partial panel region PPR2 may be performed based on not the black data voltage VBLACK but the blank voltage VBLANK, and thus the luminance difference between the first and second partial panel regions PPR1 and PPR2 when driven at the different driving frequencies from each other may be reduced.

Figure 8:
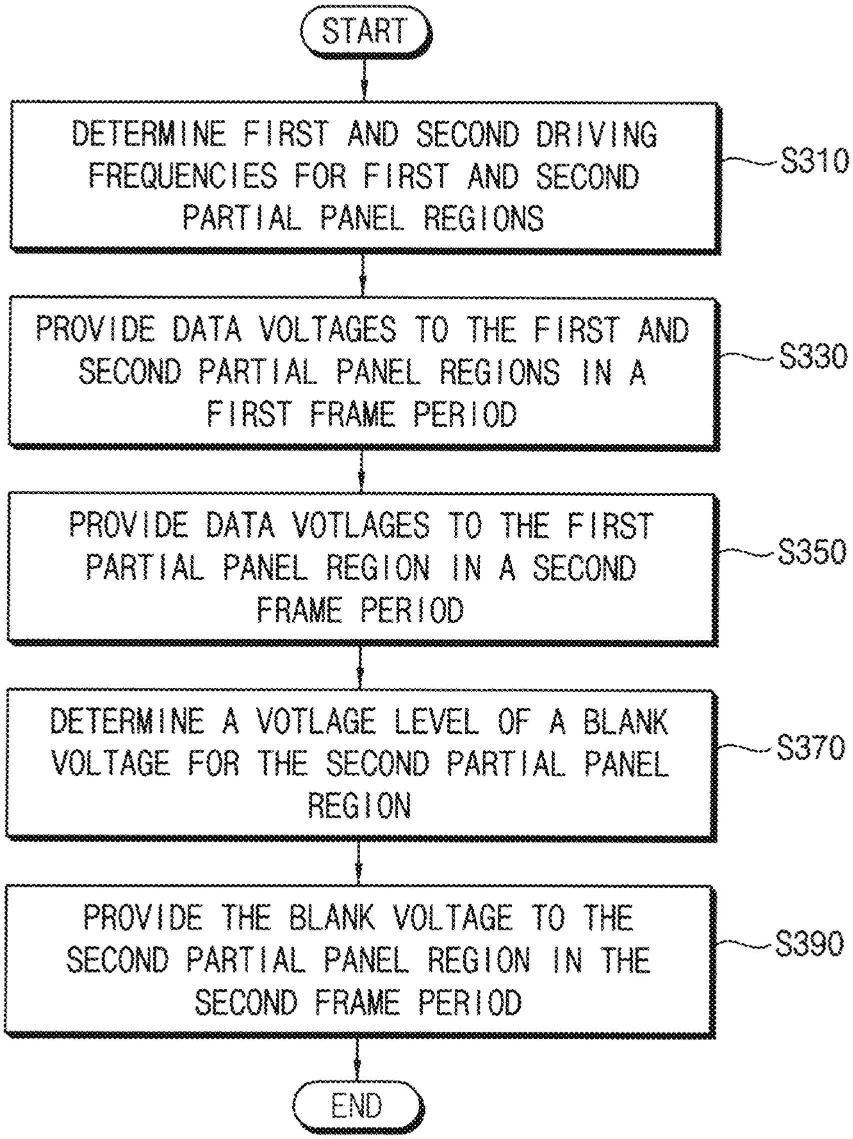
FIG. 8 is a flowchart illustrating a method of operating a display device according to an embodiment.
Figure 9:
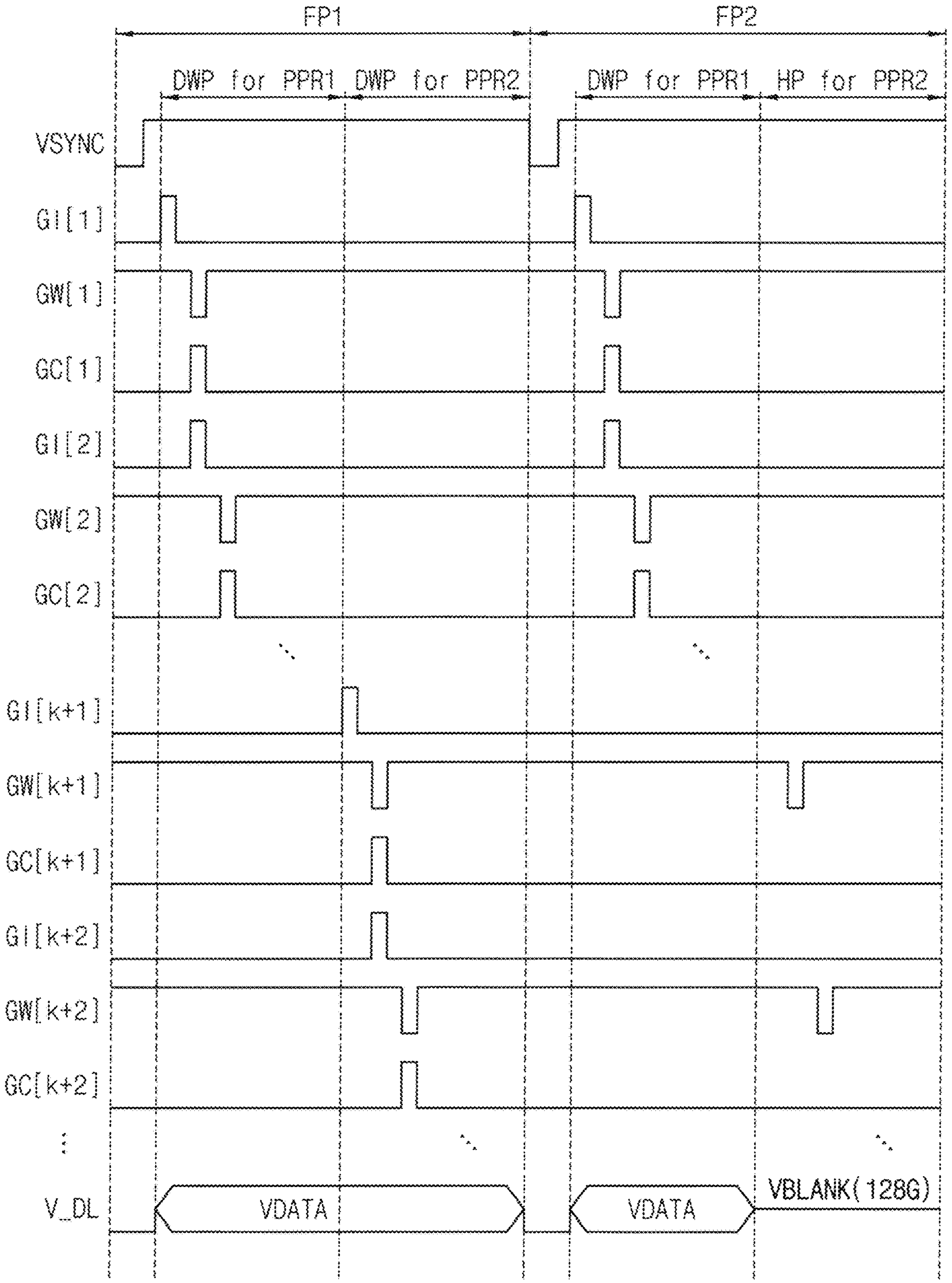
FIG. 9 is a timing diagram for describing an embodiment of an operation of a display device where a first partial panel region is driven at a normal driving frequency and a second partial panel region is driven at a low frequency.

FIG. 8 is a flowchart illustrating a method of operating a display device according to an embodiment, FIG. 9 is a timing diagram for describing an embodiment of an operation of a display device where a first partial panel region is driven at a normal driving frequency and a second partial panel region is driven at a low frequency, FIG. 10 is a diagram for describing an embodiment of a data writing and biasing operation of a pixel in a data writing period, and FIG. 11 is a diagram for describing an embodiment of a biasing operation of a pixel in a holding period.

Referring to FIGS. 1 and 8, in an embodiment of a method of operating a display device 100, a panel driver 190 may determine a first driving frequency for a first partial panel region PPR1 of a display panel 110 and a second driving frequency for a second partial panel region PPR2 of the display panel 110 (S310). In one embodiment, for example, in a case where a moving image is displayed in the first partial panel region PPR1 and a still image is displayed in the second partial panel region PPR2, the panel driver 190 may determine the first driving frequency for the first partial panel region PPR1 as a normal driving frequency (e.g., about 60 Hz, about 100 Hz, about 120 Hz, etc.), and may determine the second driving frequency for the second partial panel region PPR2 as a low frequency lower than the normal driving frequency.

In a case where the second driving frequency is lower than the first driving frequency, for example in a case where the first driving frequency for the first partial panel region PPR1 is determined as the normal driving frequency, the second driving frequency for the second partial panel region PPR2 is determined as the low frequency, the panel driver 190 may provide data voltages VDATA to the first and second partial panel regions PPR1 and PPR2 in a first frame period (S330). In one embodiment, for example, as illustrated in FIG. 9, in a data writing period DWP for the first partial panel region PPR1 within the first frame period FP1, a scan driver 130 may sequentially provide gate initialization signals GI[1], GI[2], . . . , gate writing signals GW[1], GW[2], . . . , and gate compensation signals GC[1], GC[2], . . . to pixels PX of the first partial panel region PPR1 on a row-by-row basis, and a data driver 120 may provide the data voltages VDATA corresponding to output image data ODAT to the pixels PX of the first partial panel region PPR1. In such an embodiment, in a data writing period DWP for the second partial panel region PPR2 within the first frame period FP1, the scan driver 130 may sequentially provide gate initialization signals GI[k+1], GI[k+2], . . . , gate writing signals GW[k+1], GW[k+2], . . . , and gate compensation signals GC[k+1], GC[k+2], . . . to pixels PX of the second partial panel region PPR2 on a row-by-row basis, and the data driver 120 may provide the data voltages VDATA corresponding to output image data ODAT to the pixels PX of the second partial panel region PPR2.

In an embodiment, as illustrated in FIG. 9, to the pixels PX in each row (e.g., a first row), the gate initialization signal (e.g., GI[1]) may be first applied, and then the gate writing signal (e.g., GW[1]) and the gate compensation signal (e.g., GC[1]) may be substantially simultaneously applied. In such an embodiment, while the gate writing signal (e.g., GW[1]) and the gate compensation signal (e.g., GC[1]) are applied, the data voltages VDATA may be applied to the pixels PX in the row (e.g., the first row). In an embodiment, as illustrated in FIG. 10, while the gate initialization signal GI[n] is applied to a pixel PX@DWP, a first initialization transistor T4 may be turned on, and a storage capacitor CST and a gate of a driving transistor T1 may be initialized based on a first initialization voltage VINT1. Thereafter, while the gate writing signal GW[n], the gate compensation signal GC[n] and the data voltage VDATA are applied, a data writing and biasing operation for the pixel PX@DWP may be performed based on the data voltage VDATA. That is, a switching transistor T2 may be turned on in response to the gate writing signal GW[n], the driving transistor T1 may be diode-connected by a compensation transistor T3 that is turned on in response to the gate compensation signal GC[n], the data voltage VDATA may be applied to a source of the driving transistor T1, and a voltage VDATA-VTH generated by subtracting a threshold voltage VTH of the driving transistor T1 from the data voltage VDATA may be applied to a gate of the driving transistor T1. Accordingly, the voltage VDATA-VTH generated by subtracting the threshold voltage VTH from the data voltage VDATA may be stored in the storage capacitor CST, and a first on-bias based on the data voltage VDATA may be applied to the driving transistor T1. That is, as the first on-bias based on the data voltage VDATA, the data voltage VDATA may be applied to the source of the driving transistor T1, and the voltage VDATA-VTH generated by subtracting the threshold voltage VTH from the data voltage VDATA may be applied to the gate of the driving transistor T1. Thereafter, if the gate writing signal GW[n+1] for the next pixel row is applied, a second initialization transistor T7 may be turned on, and an organic light emitting diode EL may be initialized based on a second initialization voltage VINT2.

The panel driver 190 may provide the data voltages VDATA to the first partial panel region PPR1 in a second frame period (S350). In one embodiment, for example, as illustrated in FIG. 9, in a data writing period DWP for the first partial panel region PPR1 within the second frame period FP2, the scan driver 130 may sequentially provide the gate initialization signals GI[1], GI[2], . . . , the gate writing signals GW[1], GW[2], . . . , and the gate compensation signals GC[1], GC[2], . . . to the pixels PX of the first partial panel region PPR1 on a row-by-row basis, and the data driver 120 may provide the data voltages VDATA corresponding to the output image data ODAT to the pixels PX of the first partial panel region PPR1. Accordingly, as illustrated in FIG. 10, in the data writing period DWP for the first partial panel region PPR1 within the second frame period FP2, the pixels PX@DWP of the first partial panel region PPR1 may perform the data writing and biasing operations based on the data voltages VDATA.

The panel driver 190 may determine a voltage level of a blank voltage VBLANK for the second partial panel region PPR2 (S370). In an embodiment, the panel driver 190 may determine the voltage level of the blank voltage VBLANK for the second partial panel region PPR2 as a voltage level of the data voltage VDATA corresponding to a gray level higher than a black gray level. In one embodiment, for example, the panel driver 190 may determine the voltage level of the blank voltage VBLANK for the second partial panel region PPR2 as a voltage level of the data voltage VDATA corresponding to a 128-gray level (128G).

The panel driver 190 may provide the blank voltage VBLANK to the second partial panel region PPR2 in the second frame period (S390). In one embodiment, for example, as illustrated in FIG. 9, in a holding period HP for the second partial panel region PPR2 within the second frame period FP2, the scan driver 130 may not provide the gate initialization signals GI[k+1], GI[k+2], . . . , and the gate compensation signals GC[k+1], GC[k+2], . . . to the pixels PX of the second partial panel region PPR2, the scan driver 130 may sequentially provide only the gate writing signals GW[k+1], GW[k+2], . . . to the pixels PX of the second partial panel region PPR2 on a row-by-row basis, and the data driver 120 may provide the blank data VBLANK to the pixels PX of the second partial panel region PPR2.

In the holding period HP for the second partial panel region PPR2 within the second frame period FP2, if the gate writing signals GW[k+1], GW[k+2], . . . and the blank data VBLANK are applied to the pixels PX of the second partial panel region PPR2, as illustrated in FIG. 11, the pixels PX@HP of the second partial panel region PPR2 may perform biasing operations based on the blank data VBLANK. That is, when the switching transistor T2 is turned on in response to the gate writing signal GW[n], the blank data VBLANK may be applied to the source of the driving transistor T1, and a voltage VSTORED stored in the storage capacitor CST (e.g., the voltage VDATA-VTH stored in the storage capacitor CST in the first frame period FP1) may be applied to the gate of the driving transistor T1. Thus, a second on-bias based on the blank data VBLANK may be applied to the driving transistor T1. Accordingly, the driving transistor T1 of each pixel PX@HP of the second partial panel region PPR2 may be turned on based on the second on-bias, and a hysteresis of the driving transistor T1 may be initialized based on the second on-bias. Since the blank voltage VBLANK has the voltage level of the data voltage VDATA corresponding to the gray level (e.g., 128G) higher than the black gray level (e.g., 0G), a difference between the first on-bias based on the data voltage VDATA and the second on-bias based on the blank voltage VBLANK may be reduced, and a hysteresis difference between the driving transistors T1 of the first and second partial panel regions PPR1 and PPR2 may be reduced. Thereafter, when the gate writing signal GW[n+1] for the next pixel row is applied, the second initialization transistor T7 may be turned on, and the organic light emitting diode EL may be initialized based on the second initialization voltage VINT2.

Figure 12:
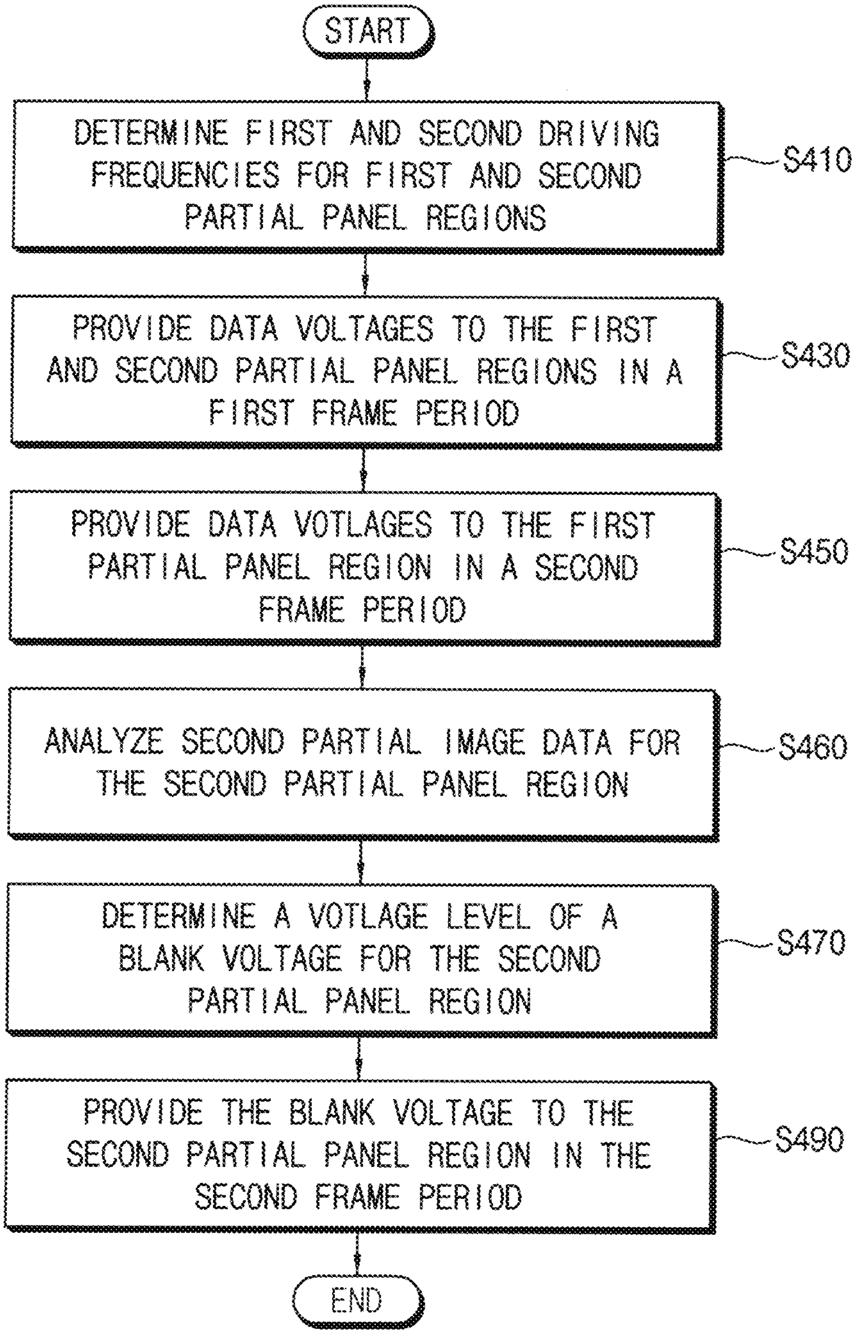
FIG. 12 is a flowchart illustrating a method of operating a display device according to an alternative embodiment.
Figure 13:
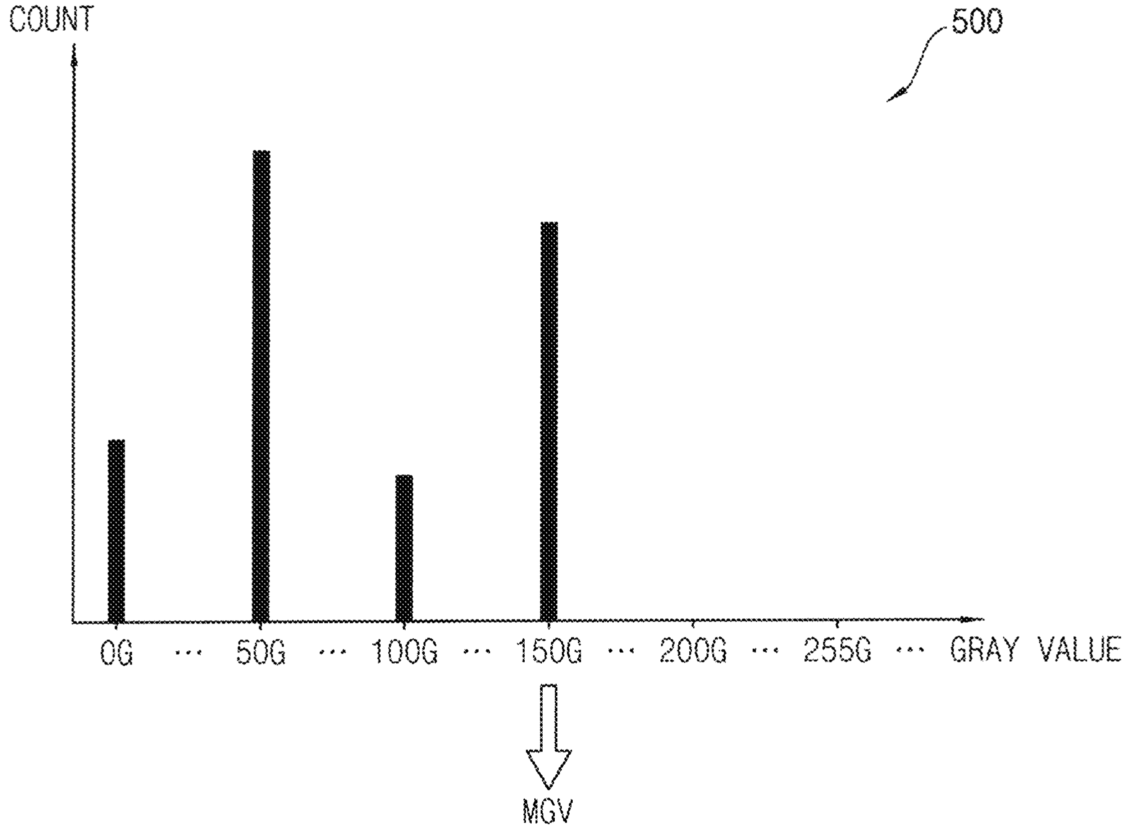
FIG. 13 is a diagram illustrating an embodiment of a histogram of second partial image data for a second partial panel region.

FIG. 12 is a flowchart illustrating a method of operating a display device according to an alternative embodiment, and FIG. 13 is a diagram illustrating an embodiment of a histogram of second partial image data for a second partial panel region.

A method of FIG. 12 may be substantially the same as a method of FIG. 8, except that, in the method of FIG. 12, a voltage level of a blank voltage for a second partial panel region may be determined by analyzing second partial image data for the second partial panel region.

Referring to FIGS. 1 and 12, in an embodiment of a method of operating a display device 100, a panel driver 190 may determine a first driving frequency for a first partial panel region PPR1 of a display panel 110 and a second driving frequency for a second partial panel region PPR2 of the display panel 110 (S410).

In a case where the second driving frequency is lower than the first driving frequency, the panel driver 190 may provide data voltages VDATA to the first and second partial panel regions PPR1 and PPR2 in a first frame period (S430). Thus, in the first frame period, data writing and biasing operations for pixels PX of the first and second partial panel regions PPR1 and PPR2 may be performed based on the data voltages VDATA, and first on-biases based on the data voltages VDATA may be applied to driving transistors of the pixels PX.

The panel driver 190 may provide the data voltages VDATA to the first partial panel region PPR1 in a second frame period (S450). Thus, in the second frame period, the data writing and biasing operations for the pixels PX of the first partial panel region PPR1 may be performed based on the data voltages VDATA, and the first on-biases based on the data voltages VDATA may be applied to the driving transistors of the pixels PX of the first partial panel region PPR1.

The panel driver 190 may divide input image data IDAT for the display panel 110 into first partial image data for the first partial panel region PPR1 and second partial image data for the second partial panel region PPR2, may analyze the second partial image data for the second partial panel region PPR2 (S460), and may determine a voltage level of a blank voltage VBLANK for the second partial panel region PPR2 based on a result of the analysis (S470). In one embodiment, for example, as illustrated in FIG. 13, the panel driver 190 may generate a histogram 500 of the second partial image data by counting the numbers of respective gray levels 0G, 50G, . . . , 100G, . . . , 150G, . . . , 200G, . . . , and 255G represented by the second partial image data, and may determine the voltage level of the blank voltage VBLANK by using the histogram 500 of the second partial image data.

In some embodiments, the panel driver 190 may determine the maximum gray level MGV of gray levels represented by the second partial image data by using the histogram 500 of the second partial image data, and may determine the voltage level of the blank voltage VBALNK for the second partial panel region PPR2 as a voltage level of the data voltage VDATA corresponding to the maximum gray level MGV. In an embodiment of FIG. 13, the panel driver 190 may determine the voltage level of the blank voltage VBALNK for the second partial panel region PPR2 as a voltage level of the data voltage VDATA corresponding to a 150-gray level 150G.

In an alternative embodiment, the panel driver 190 may determine the maximum gray level MGV of gray levels represented by the second partial image data by using the histogram 500 of the second partial image data, and may determine the voltage level of the blank voltage VBALNK for the second partial panel region PPR2 as a voltage level of the data voltage VDATA corresponding to a gray level higher than the black gray level 0G and lower than the maximum gray level MGV. In one embodiment, for example, the panel driver 190 may determine the voltage level of the blank voltage VBALNK for the second partial panel region PPR2 as a voltage level of the data voltage VDATA corresponding to a 75-gray level that is a middle value between the 0-gray level 0G and the 150-gray level 150G.

In another alternative embodiment, the panel driver 190 may determine an average gray level of gray levels represented by the second partial image data by using the histogram 500 of the second partial image data, and may determine the voltage level of the blank voltage VBALNK for the second partial panel region PPR2 as a voltage level of the data voltage VDATA corresponding to the average gray level.

The panel driver 190 may provide the blank voltage VBLANK to the second partial panel region PPR2 in the second frame period (S490). Thus, in the second frame period, biasing operations for the pixels PX of the second partial panel region PPR2 may be performed based on the blank data VBLANK, and second on-biases based on the blank data VBLANK may be applied to the driving transistors of the pixels PX of the second partial panel region PPR2. Since the voltage level of the blank voltage VBLANK for the second partial panel region PPR2 is determined by analyzing the second partial image data for the second partial panel region PPR2, a difference between the first on-bias based on the data voltage VDATA and the second on-bias based on the blank voltage VBLANK may be reduced, and a hysteresis difference between the driving transistors of the first and second partial panel regions PPR1 and PPR2 may be reduced.

Figure 14:
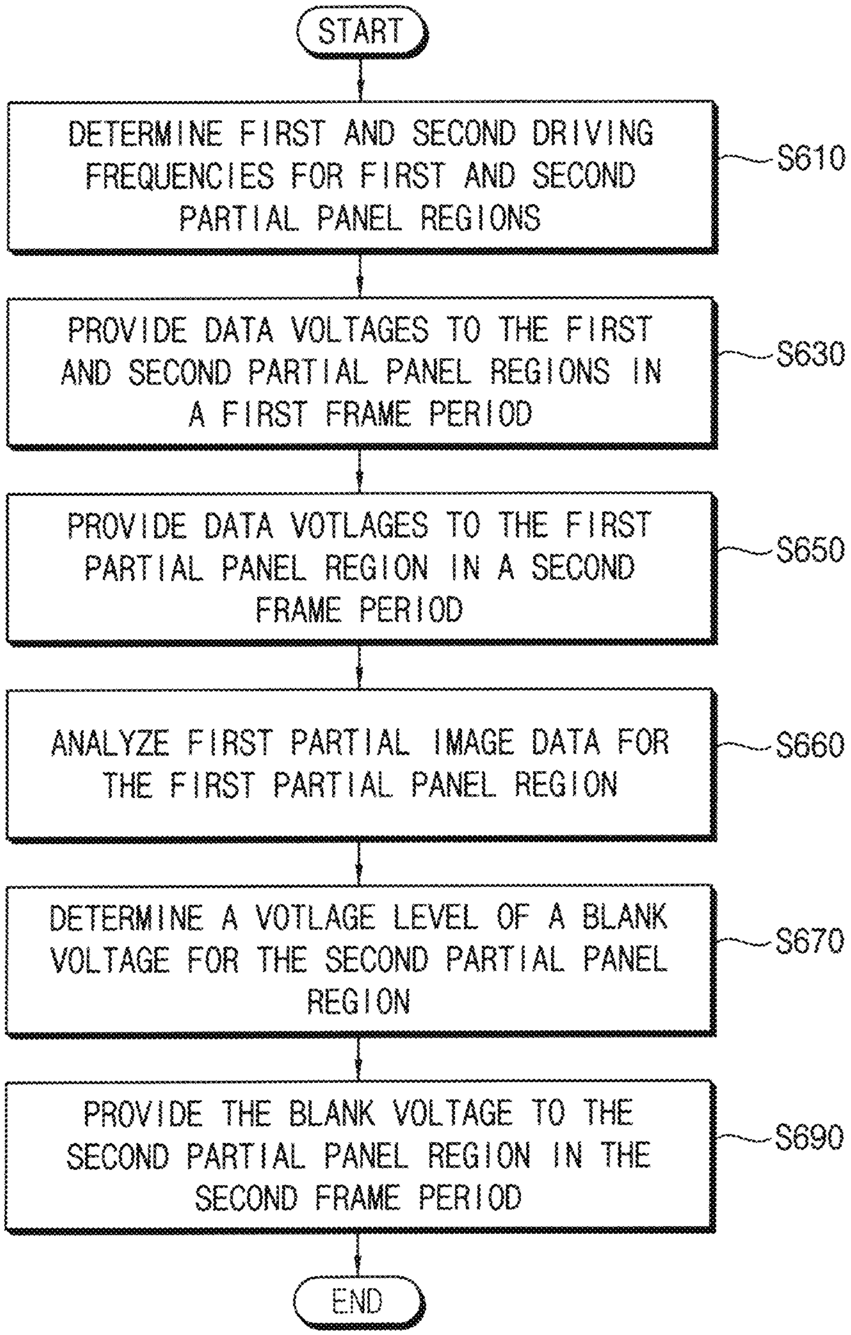
FIG. 14 is a flowchart illustrating a method of operating a display device according to another alternative embodiment.

FIG. 14 is a flowchart illustrating a method of operating a display device according to another alternative embodiment.

A method of FIG. 14 may be substantially the same as a method of FIG. 8, except that, in the method of FIG. 14, a voltage level of a blank voltage for a second partial panel region may be determined by analyzing first partial image data for a first partial panel region.

Referring to FIGS. 1 and 14, in an embodiment of a method of operating a display device 100, a panel driver 190 may determine a first driving frequency for a first partial panel region PPR1 of a display panel 110 and a second driving frequency for a second partial panel region PPR2 of the display panel 110 (S610).

In a case where the second driving frequency is lower than the first driving frequency, the panel driver 190 may provide data voltages VDATA to the first and second partial panel regions PPR1 and PPR2 in a first frame period (S630). Thus, in the first frame period, data writing and biasing operations for pixels PX of the first and second partial panel regions PPR1 and PPR2 may be performed based on the data voltages VDATA, and first on-biases based on the data voltages VDATA may be applied to driving transistors of the pixels PX.

The panel driver 190 may provide the data voltages VDATA to the first partial panel region PPR1 in a second frame period (S650). Thus, in the second frame period, the data writing and biasing operations for the pixels PX of the first partial panel region PPR1 may be performed based on the data voltages VDATA, and the first on-biases based on the data voltages VDATA may be applied to the driving transistors of the pixels PX of the first partial panel region PPR1.

The panel driver 190 may divide input image data IDAT for the display panel 110 into first partial image data for the first partial panel region PPR1 and second partial image data for the second partial panel region PPR2, may analyze the first partial image data for the first partial panel region PPR1 (S660), and may determine a voltage level of a blank voltage VBLANK for the second partial panel region PPR2 based on a result of the analysis (S670). In one embodiment, for example, the panel driver 190 may generate a histogram of the first partial image data, and may determine the voltage level of the blank voltage VBLANK for the second partial panel region PPR2 by using the histogram of the first partial image data. In an embodiment, the panel driver 190 may determine the voltage level of the blank voltage VBLANK for the second partial panel region PPR2 based on a maximum gray level or an average gray level of gray levels represented by the first partial image data.

The panel driver 190 may provide the blank voltage VBLANK to the second partial panel region PPR2 in the second frame period (S690). Thus, in the second frame period, biasing operations for the pixels PX of the second partial panel region PPR2 may be performed based on the blank data VBLANK, and second on-biases based on the blank data VBLANK may be applied to the driving transistors of the pixels PX of the second partial panel region PPR2. Since the voltage level of the blank voltage VBLANK for the second partial panel region PPR2 is determined by analyzing the second partial image data for the second partial panel region PPR2, a difference between the first on-bias based on the data voltage VDATA and the second on-bias based on the blank voltage VBLANK may be reduced, and a hysteresis difference between the driving transistors of the first and second partial panel regions PPR1 and PPR2 may be reduced.

Figure 15:
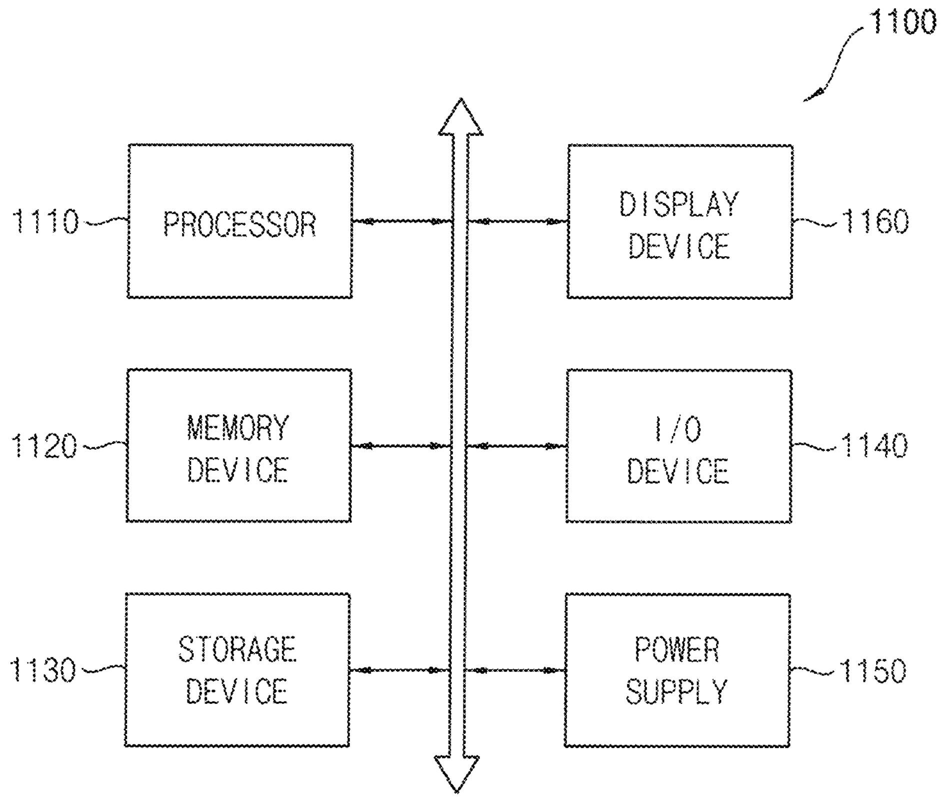
FIG. 15 is a block diagram showing an electronic device including a display device according to an embodiment.

FIG. 15 is a block diagram showing an electronic device including a display device according to an embodiment.

Referring to FIG. 15, an embodiment of an electronic device 1100 may include a processor 1110, a memory device 1120, a storage device 1130, an input/output ("I/O") device 1140, a power supply 1150, and a display device 1160. The electronic device 1100 may further include a plurality of ports for communicating a video card, a sound card, a memory card, a universal serial bus ("USB") device, other electric devices, etc.

The processor 1110 may perform various computing functions or tasks. The processor 1110 may be an application processor ("AP"), a microprocessor or a central processing unit ("CPU"), etc. The processor 1110 may be coupled to other components via an address bus, a control bus, a data bus, etc. In an embodiment, the processor 1110 may be further coupled to an extended bus such as a peripheral component interconnection ("PCI") bus.

The memory device 1120 may store data for operations of the electronic device 1100. In one embodiment, for example, the memory device 1120 may include a non-volatile memory device such as an erasable programmable read-only memory ("EPROM") device, an electrically erasable programmable read-only memory ("EEPROM") device, a flash memory device, a phase change random access memory ("PRAM)" device, a resistance random access memory ("RRAM") device, a nano floating gate memory ("NFGM") device, a polymer random access memory ("PoRAM") device, a magnetic random access memory ("MRAM") device, a ferroelectric random access memory ("FRAM") device, etc., and/or a volatile memory device such as a dynamic random access memory ("DRAM") device, a static random access memory ("SRAM") device, a mobile DRAM device, etc.

The storage device 1130 may be a solid state drive ("SSD") device, a hard disk drive ("HDD") device, a CD-ROM device, etc. The I/O device 1140 may be an input device such as a keyboard, a keypad, a mouse, a touch screen, etc., and an output device such as a printer, a speaker, etc. The power supply 1150 may supply power for operations of the electronic device 1100. The display device 1160 may be coupled to other components through the buses or other communication links.

In an embodiment of the display device 1160, a first driving frequency for a first partial panel region of a display panel and a second driving frequency for a second partial panel region of the display panel may be determined. In a case where the second driving frequency is lower than the first driving frequency, data voltages may be provided to the first and second partial panel regions in a first frame period. In such an embodiment, in a second frame period, the data voltages may be provided to the first partial panel region, a voltage level of a blank voltage for the second partial panel region may be determined, and the blank voltage may be provided to the second partial panel region. Accordingly, since the first and second partial panel regions are driven at different driving frequencies, power consumption of the display device may be reduced. In such an embodiment, a biasing operation for pixels in the second partial panel region may be performed based on not a black data voltage but the blank voltage, and thus a luminance difference between the first and second partial panel regions driven at the different driving frequencies may be reduced.

Embodiments of the invention may be applied to any display device 1160, and any electronic device 1100 including the display device 1160. In one embodiment, for example, the inventions may be applied to a mobile phone, a smart phone, a wearable electronic device, a tablet computer, a television ("TV"), a digital TV, a three-dimensional ("3D") TV, a personal computer ("PC"), a home appliance, a laptop computer, a personal digital assistant ("PDA"), a portable multimedia player ("PMP"), a digital camera, a music player, a portable game console, a navigation device, etc.

The invention should not be construed as being limited to the embodiments set forth herein. Rather, these embodiments are provided so that this disclosure will be thorough and complete and will fully convey the concept of the invention to those skilled in the art.

While the invention has been particularly shown and described with reference to embodiments thereof, it will be understood by those of ordinary skill in the art that various changes in form and details may be made therein without departing from the spirit or scope of the invention as defined by the following claims.

What is claimed is:

1. A display device comprising:

a display panel including a first partial panel region and a second partial panel region; and a panel driver which drives the display panel, wherein the panel driver determines a first driving frequency for the first partial panel region and a second driving frequency for the second partial panel region, wherein, in a case where the second driving frequency is lower than the first driving frequency, a second frame period includes a data writing period for the first partial panel region and a holding period for the second partial panel region, and wherein the panel driver provides data voltages to the first partial panel region during the data writing period, and provides a blank voltage different from a black data voltage to the second partial panel region during the holding period.

2. The display device of claim 1, wherein, in a first frame period, data writing and biasing operations for pixels of the first and second partial panel regions are performed based on the data voltages, and wherein, in the second frame period, the data writing and biasing operations for the pixels of the first partial panel region are performed based on the data voltages, and biasing operations for the pixels of the second partial panel region are performed based on the blank voltage.

3. The display device of claim 2, wherein, in the first frame period, by the data writing and biasing operations, voltages generated by subtracting threshold voltages of driving transistors of the pixels of the first and second partial panel regions from the data voltages are stored in storage capacitors of the pixels of the first and second partial panel regions, and first on-biases based on the data voltages are applied to the driving transistors of the pixels of the first and second partial panel regions, wherein, in the second frame period, by the data writing and biasing operations, the voltages generated by subtracting the threshold voltages of the driving transistors of the pixels of the first partial panel region from the data voltages are stored in the storage capacitors of the pixels of the first partial panel region, and the first on-biases based on the data voltages are applied to the driving transistors of the pixels of the first partial panel region, and wherein, in the second frame period, by the biasing operations, second on-biases based on the blank voltage are applied to the driving transistors of the pixels of the second partial panel region.

4. The display device of claim 1, wherein the panel driver determines a voltage level of the blank voltage for the second partial panel region as a voltage level of the data voltage corresponding to a gray level higher than a black gray level of the black data voltage.

5. The display device of claim 1, wherein the panel driver divides input image data for the display panel into first partial image data for the first partial panel region and second partial image data for the second partial panel region, and determines a voltage level of the blank voltage for the second partial panel region by analyzing the second partial image data for the second partial panel region.

6. The display device of claim 5, wherein the panel driver determines a maximum gray level of gray levels represented by the second partial image data for the second partial panel region, and determines the voltage level of the blank voltage for the second partial panel region as a voltage level of the data voltage corresponding to the maximum gray level.

7. The display device of claim 5, wherein the panel driver determines a maximum gray level of gray levels represented by the second partial image data for the second partial panel region, and determines the voltage level of the blank voltage for the second partial panel region as a voltage level of the data voltage corresponding to a gray level higher than a black gray level of the black data voltage and lower than the maximum gray level.

8. The display device of claim 5, wherein the panel driver determines an average gray level of gray levels represented by the second partial image data for the second partial panel region, and determines the voltage level of the blank voltage for the second partial panel region as a voltage level of the data voltage corresponding to the average gray level.

9. The display device of claim 1, wherein the panel driver divides input image data for the display panel into first partial image data for the first partial panel region and second partial image data for the second partial panel region, and determines a voltage level of the blank voltage for the second partial panel region by analyzing the first partial image data for the first partial panel region.

10. The display device of claim 9, wherein the panel driver determines the voltage level of the blank voltage for the second partial panel region based on a maximum gray level or an average gray level of gray levels represented by the first partial image data for the first partial panel region.

11. The display device of claim 1, wherein each pixel in the first and second partial panel regions includes:

a driving transistor which generates a driving current;

a switching transistor which transfers the data voltage or the blank voltage to a source of the driving transistor in response to a gate writing signal;

a compensation transistor which diode-connects the driving transistor in response to a gate compensation signal;

a storage capacitor which stores a voltage generated by subtracting a threshold voltage of the driving transistor from the data voltage;

a first initialization transistor which provides a first initialization voltage to the storage capacitor and a gate of the driving transistor in response to a gate initialization signal;

a first emission transistor which couples a line of a power supply voltage to the source of the driving transistor in response to an emission signal;

a second emission transistor which couples a drain of the driving transistor to an organic light emitting diode in response to the emission signal;

a second initialization transistor which provides a second initialization voltage to the organic light emitting diode in response to the gate writing signal for a next pixel row; and the organic light emitting diode which emits light based on the driving current.

12. The display device of claim 11, wherein at least one selected from the driving, switching, compensation, first initialization, first emission, second emission and second initialization transistors is implemented with a p-type metal-oxide-semiconductor transistor, and at least one selected from the driving, switching, compensation, first initialization, first emission, second emission and second initialization transistors is implemented with an n-type metal-oxide-semiconductor transistor.

13. The display device of claim 1, wherein the display device is a foldable display device, and wherein a boundary between the first partial panel region and the second partial panel region corresponds to a folding line of the foldable display device.

14. A panel driver for driving a display panel, the panel driver configured to:

determine a first driving frequency for a first partial panel region of the display panel and a second driving frequency for a second partial panel region of the display panel, wherein, in a case where the second driving frequency is lower than the first driving frequency, a second frame period includes a data writing period for the first partial panel region and a holding period for the second partial panel region, and wherein the panel driver provides data voltages to the first partial panel region during the data writing period, and provides a blank voltage different from a black data voltage to the second partial panel region during the holding period.

15. The panel driver of claim 14, wherein, in a first frame period, data writing and biasing operations for pixels of the first and second partial panel regions are performed based on the data voltages, and wherein, in the second frame period, the data writing and biasing operations for the pixels of the first partial panel region are performed based on the data voltages, and biasing operations for the pixels of the second partial panel region are performed based on the blank voltage.

16. The panel driver of claim 14, wherein the panel driver divides input image data for the display panel into first partial image data for the first partial panel region and second partial image data for the second partial panel region, and determines a voltage level of the blank voltage for the second partial panel region by analyzing the second partial image data for the second partial panel region.

17. The panel driver of claim 14, wherein the panel driver divides input image data for the display panel into first partial image data for the first partial panel region and second partial image data for the second partial panel region, and determines a voltage level of the blank voltage for the second partial panel region by analyzing the first partial image data for the first partial panel region.

18. The panel driver of claim 14, wherein the panel driver includes:

a data driver which provides the data voltages or the blank voltage to the display panel;

a scan driver which provides a gate initialization signal, a gate writing signal and a gate compensation signal to the display panel;

an emission driver which provides an emission signal to the display panel; and a controller which controls the data driver, the scan driver and the emission driver, determines the first and second driving frequencies for the first and second partial panel regions, and determines a voltage level of the blank voltage for the second partial panel region.

19. The panel driver of claim 18, wherein the controller includes:

a still image detector which divides input image data for the display panel into first partial image data for the first partial panel region and second partial image data for the second partial panel region, and determines whether each of the first and second partial image data represent a still image;

a driving frequency decider which determines the first driving frequency for the first partial panel region according to whether the first partial image data represent the still image, and determines the second driving frequency for the second partial panel region according to whether the second partial image data represent the still image; and a blank voltage decider which determines the voltage level of the blank voltage.

20. The panel driver of claim 19, wherein, in a case where the first partial image data represent a moving image and the second partial image data represent the still image, the driving frequency decider determines the first driving frequency as a normal driving frequency, and determines the second driving frequency as a low frequency lower than the normal driving frequency, wherein the scan driver provides the gate initialization signal, the gate writing signal and the gate compensation signal to each pixel of the first partial panel region at the normal driving frequency, and wherein the scan driver provides the gate writing signal at the normal driving frequency to each pixel of the second panel region, and provides the gate initialization signal and the gate compensation signal at the low frequency to each pixel of the second panel region.

* * * * *